(12) United States Patent
Minagawa et al.

(10) Patent No.: US 6,937,241 B2
(45) Date of Patent: Aug. 30, 2005

(54) ELECTRONIC COMIC VIEWING APPARATUS AND METHOD AND RECORDING MEDIUM

(75) Inventors: Hiroshi Minagawa, Tokyo (JP); Yuji Sakka, Tokyo (JP)

(73) Assignee: Square Enix Co., Ltd., Tokyo (JP)

(*) Notice: Subject to any disclaimer, the term of this patent is extended or adjusted under 35 U.S.C. 154(b) by 171 days.

(21) Appl. No.: 10/084,322

(22) Filed: Feb. 28, 2002

(65) Prior Publication Data

US 2002/0122039 A1 Sep. 5, 2002

(30) Foreign Application Priority Data

Mar. 2, 2001 (JP) ........................................ 2001-059345

(51) Int. Cl.⁷ .............................................. G06T 17/00
(52) U.S. Cl. ........................ 345/473; 345/472; 345/660; 345/629
(58) Field of Search ................................ 345/472, 473, 345/786, 629, 660, 715

(56) References Cited

U.S. PATENT DOCUMENTS 5,485,611 A * 1/1996 Astle .............................. 707/1
5,697,789 A 12/1997 Sameth et al.
6,010,405 A 1/2000 Morawiec
6,069,622 A 5/2000 Kurlander

FOREIGN PATENT DOCUMENTS

| EP | 0304892 | 3/1989 |
| JP | 7-20770 | 1/1995 |
| JP | 7-249130 | 9/1995 |
| JP | 10-240953 | 9/1998 |

OTHER PUBLICATIONS

English Language Abstract for JP Appl. No. 9–91455.

English Language Abstract for JP Appl. No. 10–240915.

* cited by examiner

*Primary Examiner*—Kimbinh T. Nguyen
(74) *Attorney, Agent, or Firm*—Greenblum & Bernstein, P.L.C.

(57) ABSTRACT

An electronic comic including at least one frame on each page, each of the frames having a balloon portion displaying words and a frame image, is viewed on a screen of a display device. The balloon portion and the frame image are stored as image data, and words displayed in the balloon portion are displayed as text data separately from the image data.

21 Claims, 29 Drawing Sheets

SCREEN

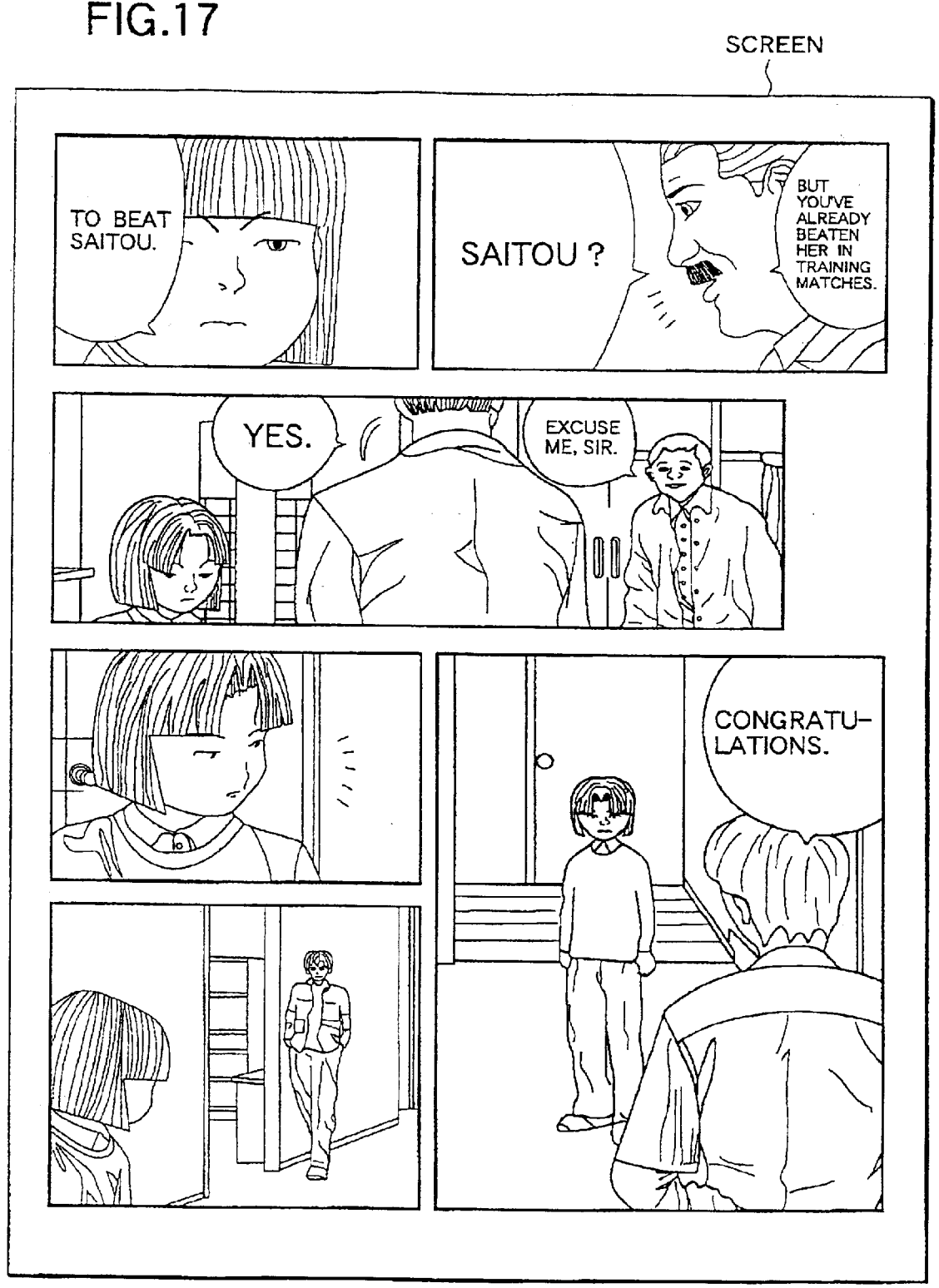

ELECTRONIC COMIC VIEWING APPARATUS AND METHOD AND RECORDING MEDIUM

CROSS REFERENCE TO RELATED APPLICATION

The present disclosure relates to subject matter contained in Japanese Patent Application No. 2001-059345, filed on Mar. 2, 2001, the disclosure of which is expressly incorporated herein by reference in its entirety.

BACKGROUND OF THE INVENTION

1. Field of the Invention

The present invention relates to display of a balloon of a character and a frame in an electronic comic displayed on a screen of a computer, for example.

2. Description of the Related Art

When a comic is displayed on a screen of a computer, a paper comic is conventionally scanned by an image scanner, for example, and the image data is displayed as it is. Thus, the image data and word data are stored together, and a balloon including words of a character is displayed frame by frame in the same manner as the paper comic.

Accordingly, it is impossible to change only letters of words independently. Therefore, the letters are always displayed in a predetermined scaling with respect to a size of the frame, for example, and it is not possible to change the size of the letters arbitrarily in accordance with the size of the frame, for example, depending on a display method.

Furthermore, the letters cannot be displayed letter by letter or frame by frame. In addition, the words of one frame cannot be displayed in a fade-in or fade-out manner.

Furthermore, the words cannot be replaced by other characters. For example, it is not possible to translate English into Japanese for display.

SUMMARY OF THE INVENTION

The present invention was made in view of these problems. It is an object of the present invention to provide an apparatus and a method for viewing an electronic comic and a recording medium, which allow the display of a balloon of a character in a comic displayed on a screen of a computer, for example, in any display order, in any expression method, or in any method for displaying an entire frame.

In view of the object, there is provided an electronic comic viewing apparatus for viewing on a screen of a display device an electronic comic including at least one frame on each page. The frame has a balloon portion displaying words and a frame image. In this case, the apparatus uses image data including the balloon portion and the frame image and text data indicating words in order to display words based on the text data in the balloon portion.

In the electronic comic viewing apparatus, the electronic comic is preferably displayed frame by frame on the screen by zooming-in each frame sequentially.

In the electronic comic viewing apparatus, frames on one page may be displayed, and either fade-in processing or fade-out processing may be performed on a predetermined frame among the displayed frames.

In the electronic comic viewing apparatus, text data corresponding to at least two languages are preferably stored as the text data and text data corresponding to a selected language is displayed within the balloon in response to a predetermined operation. In the electronic comic viewing apparatus, words may be displayed part by part within the balloon portion in a predetermined order.

Preferably, in the electronic comic viewing apparatus, at least one frame including words in its balloon portion is displayed, and either fade-in processing or fade-out processing is performed on the entire displayed words.

In the electronic comic viewing apparatus, frames on one page may be displayed, and words in a predetermined frame among the displayed frames may be displayed sequentially in a predetermined frame order.

According to another aspect of the present invention, there is provided an electronic comic viewing method for viewing on a screen of a display device an electronic comic including at least one frame on each page, and at least one frame having a balloon portion displaying words and a frame image. The method includes storing the balloon portion and the frame image as image data, storing words to be displayed in the balloon portion as text data separately from the image data, and displaying words based on the text data in the balloon portion.

In the electronic comic viewing method, the electronic comic is preferably displayed frame by frame on the screen by zooming-in each frame sequentially. In the electronic comic viewing method, frames for one page may be displayed, and either fade-in processing or fade-out processing may be performed on a predetermined frame among the frames.

In the electronic comic viewing method, text data corresponding to at least two languages are stored as the text data and text data corresponding to a selected language is displayed within the balloon in response to a predetermined operation. In the electronic comic viewing method, words are displayed part by part within the balloon portion in a predetermined order.

In the electronic comic viewing method, at least one frame including words in its balloon portion is displayed, and either fade-in processing or fade-out processing is performed on the entire displayed words.

In the electronic comic viewing method, frames on one page are displayed, and words in a predetermined frame among the displayed frames are displayed sequentially in a predetermined frame order.

According to another aspect of the present invention, there is provided a recording medium storing a program for viewing on a screen of a display device an electronic comic including at least one frame on each page. The frame has a balloon portion displaying words and a frame image. In this case, the program uses image data including the balloon portion and the frame image and text data indicating words in order to display words based on the text data in the balloon portion.

In the recording medium, the electronic comic may be displayed frame by frame on the screen by zooming-in each frame sequentially. In the recording medium, frames for one page are displayed, and either fade-in processing or fade-out processing is performed on a predetermined frame of the displayed frames.

In the recording medium, text data corresponding to at least two languages are stored as the text data and text data corresponding to a selected language is preferably displayed within the balloon in response to a predetermined operation. Words are displayed part by part within the balloon portion in a predetermined order.

In the recording medium, at least one frame including words in its balloon portion is displayed, and either fade-in processing or fade-out processing is performed on the entire displayed words.

In the recording medium, frames for one page are displayed, and words in a predetermined frame among the displayed frames are displayed sequentially in a predetermined frame order.

BRIEF DESCRIPTION OF THE DRAWINGS

FIG. 17 is an explanatory diagram of fade-in of one frame according to an aspect of the present invention;

DESCRIPTION OF THE PREFERRED EMBODIMENTS

An embodiment of the present invention will be described with reference to the appended drawings.

Figure 1:
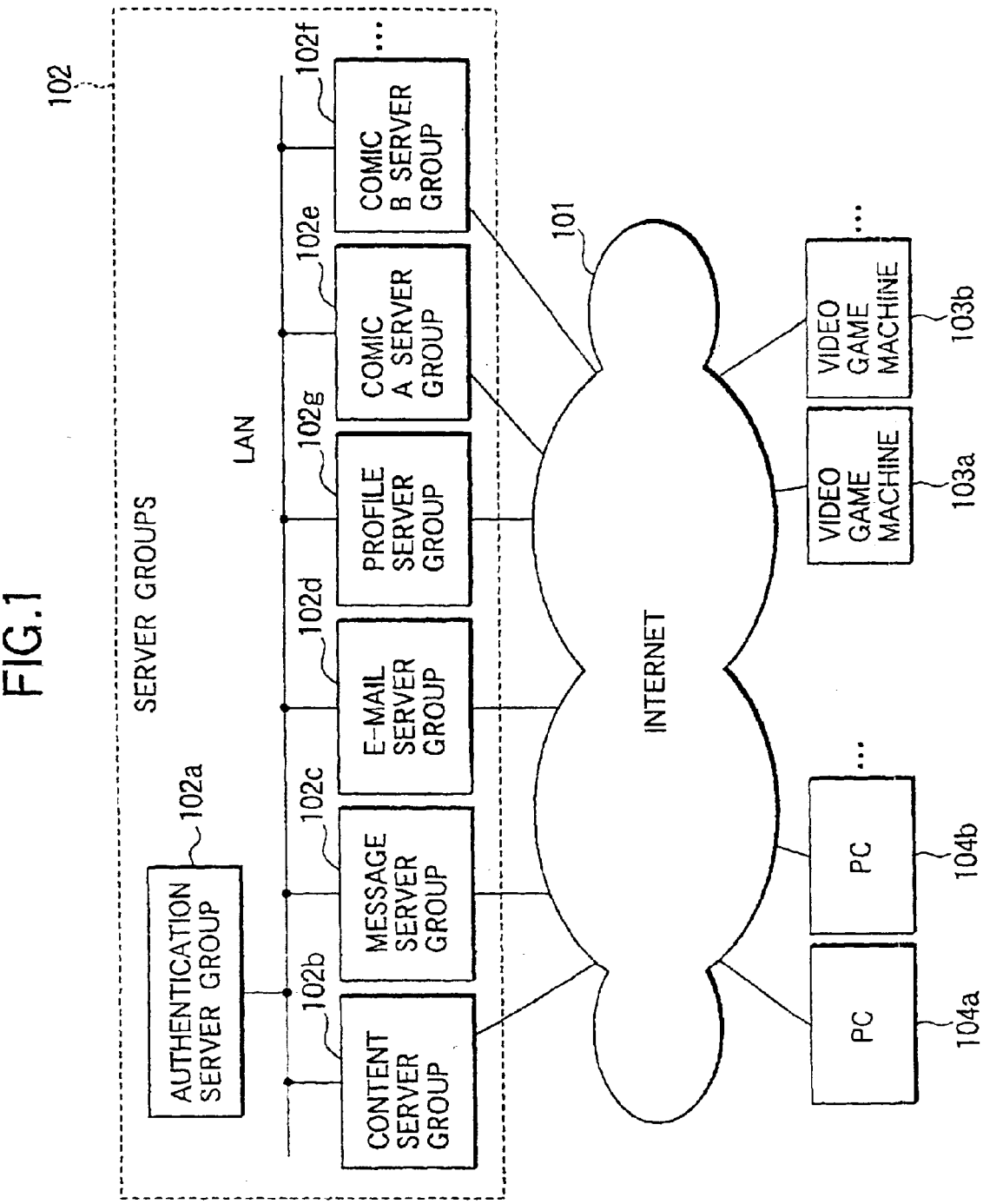
FIG. 1 is a conceptual diagram of a network system for achieving a video game according to an aspect of the present invention.

FIG. 1 is an example of a system configuration for a network game system which can implement this embodiment. Here, FIG. 1 includes server groups 102. The server groups 102 include an authentication server group 102a for user authentication, a content server group 102b for content management, a message server group 102c for message management, an e-mail server group 102d for e-mail management, a profile server group 102g for user-profile management, and comic server groups 102e and 102f for performing processing to provide a comic. Personal computers 104a and 104b and video game machines 103a and 103b may connect to the server groups 102 via a communications network 101.

Figure 2:
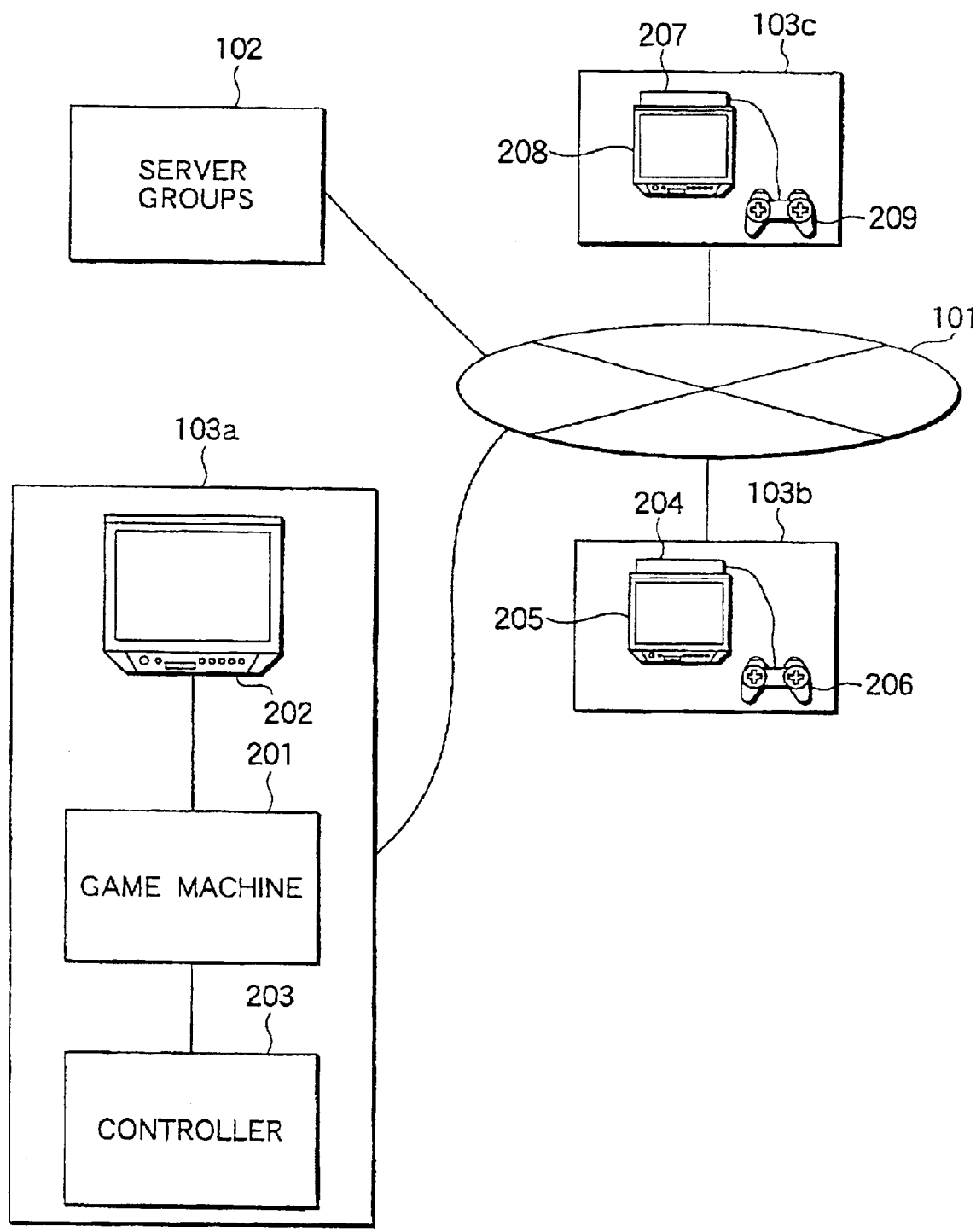
FIG. 2 is a diagram where a home game machine is used as a client system in the network shown in FIG. 1.

FIG. 2 is a diagram where a home video game machine is used as a client system in the system configuration according to this embodiment.

FIG. 2 describes an environment for using client systems 103a, 103b and 103c, all of which are home video games. These client systems 103a, 103b and 103c are connected to the server groups 102 through a communications network 101.

The client system 103a includes a game machine body 201, a television receiver 202 and a controller 203. Similarly, the client system 103b includes a game machine body 204, a television receiver 205 and a controller 206. The client system 103c includes a game machine body 207, a television receiver 208 and a controller 209.

The game machine body 201 launches a viewer in order to access the server groups 102. The television receiver 202 outputs image and voice data from the game machine body 201. The controller 203 inputs a user instruction to the game machine body 201.

Figure 3:
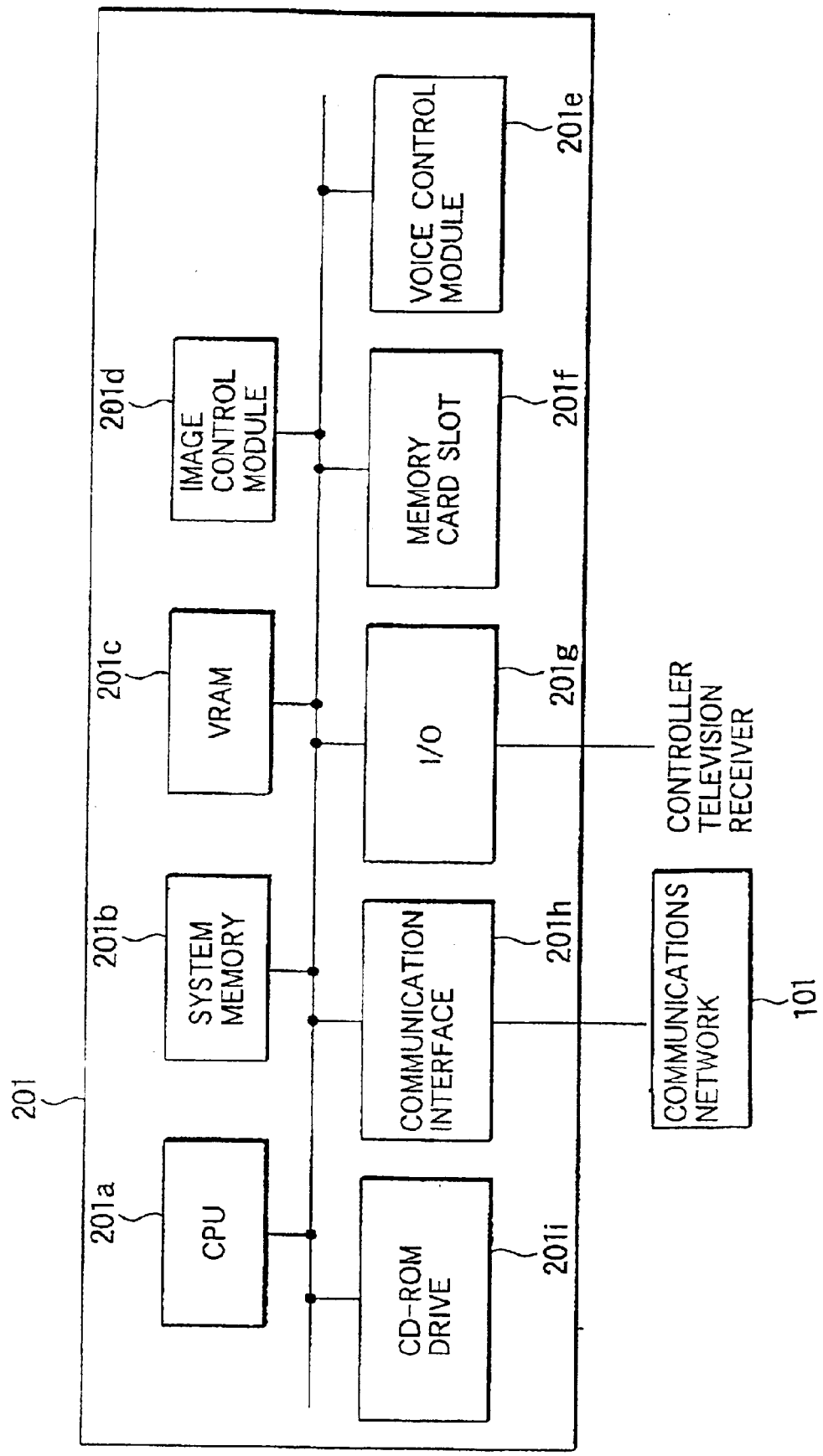
FIG. 3 is a diagram of a system configuration for the home game machine shown in FIG. 2.

FIG. 3 shows a diagram of a system configuration for the game machine body 201. In FIG. 3, the game machine body 201 includes a CPU 201a, a system memory 201b, a VRAM 201c, an image control module 201d, a voice control module 201e, a memory card slot 201f, an I/O interface 201g, a communications interface 201h and a CD-ROM drive 201i.

The CPU 201a follows a control procedure of a program loaded to or recorded in the system memory 201b and controls the game machine body 201 entirely. The system memory 201b includes a ROM and a RAM. A BIOS program is included in the ROM while a viewer program, which is loaded from a CD-ROM in the CD-ROM drive 201i, and control data are temporally recorded in the RAM.

The VRAM 201c expands and temporally records image data to be displayed in the television receiver 202. The image control module 201d controls image data to be displayed in the television receiver 202. The voice control module 201e controls voice data to be output from the television receiver 202.

The memory card slot 201f is an interface to which a memory card is inserted which records data to be referred when the CPU 201a launches the viewer. The I/O interface 201g inputs/outputs data from/to external equipment such as the television receiver 202 and the controller 203 and the game machine body 201. The communications interface 201h controls communications with the communications network 101.

The CD-ROM drive 201i drives a CD-ROM recording a program and reads the program. In this embodiment, a CD-ROM recording a viewer program including a comic viewing tool program is read out by the CD-ROM drive 201i, and the viewer program is loaded to the RAM of the system memory 201b.

Figure 4:
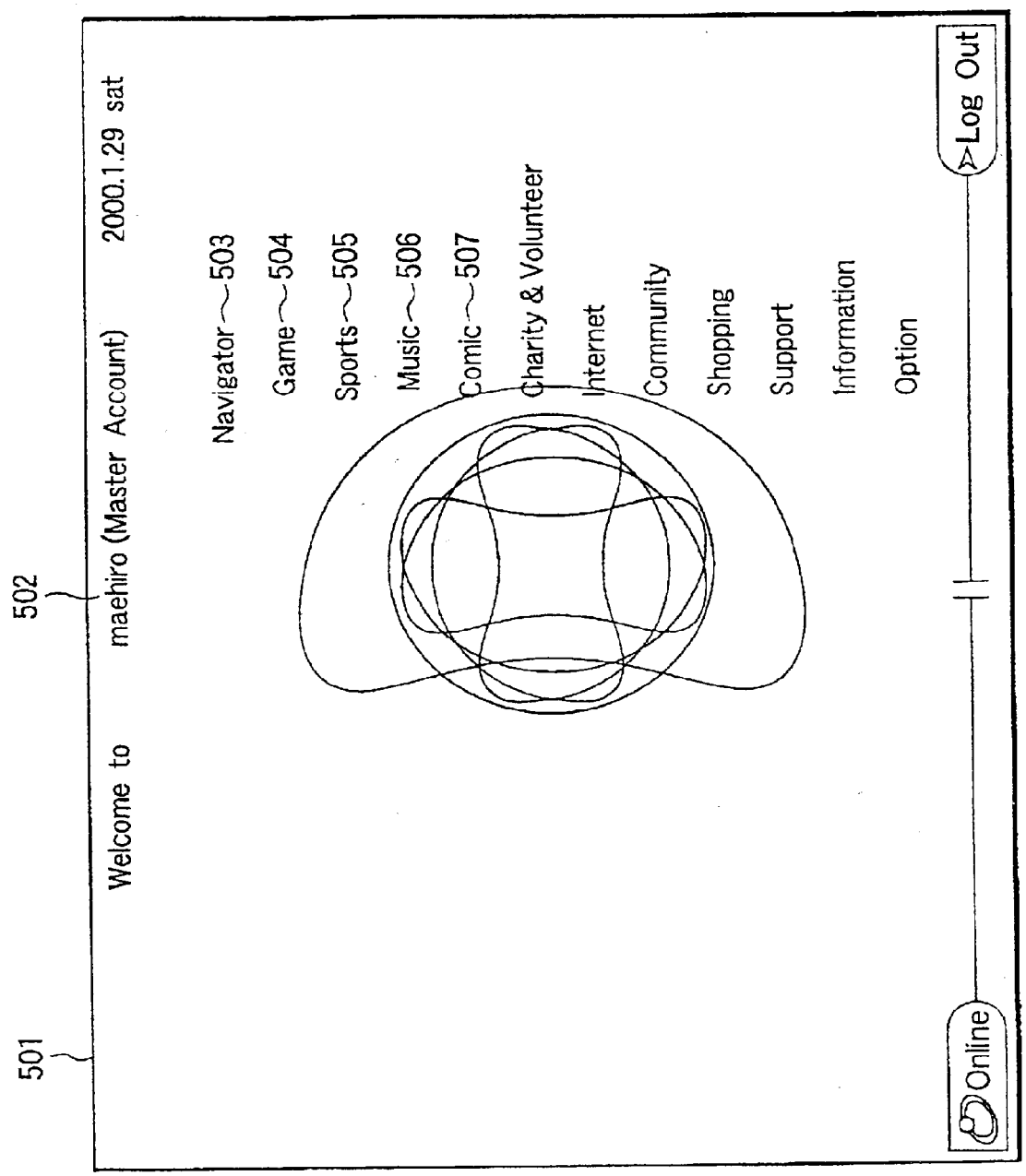
FIG. 4 is a diagram showing a viewer according to an aspect of the present invention.

Subsequently, a predetermined procedure is performed, and a viewer program is launched. Then, a viewer screen shown in FIG. 4 is displayed. A viewer menu screen 501 in FIG. 4 displays an account 502, a navigator command button 503, a game command button 504, a sports command button 505, a music command button 506, a comic command button 507 and so on.

Here, when a user selects the comic command button 507, a comic viewing tool for viewing a comic is launched. Then, accesses to the comic server groups 102e and 102f are started.

Then, a comic selection screen (not shown) is displayed on the comic viewing tool. When a user selects a comic through a predetermined button operation, image data, text data and so on corresponding to the selected comic are obtained and recorded from the comic server groups 102e and 102f. Based on these data, a comic screen shown in FIG. 5 is displayed.

Figure 5:
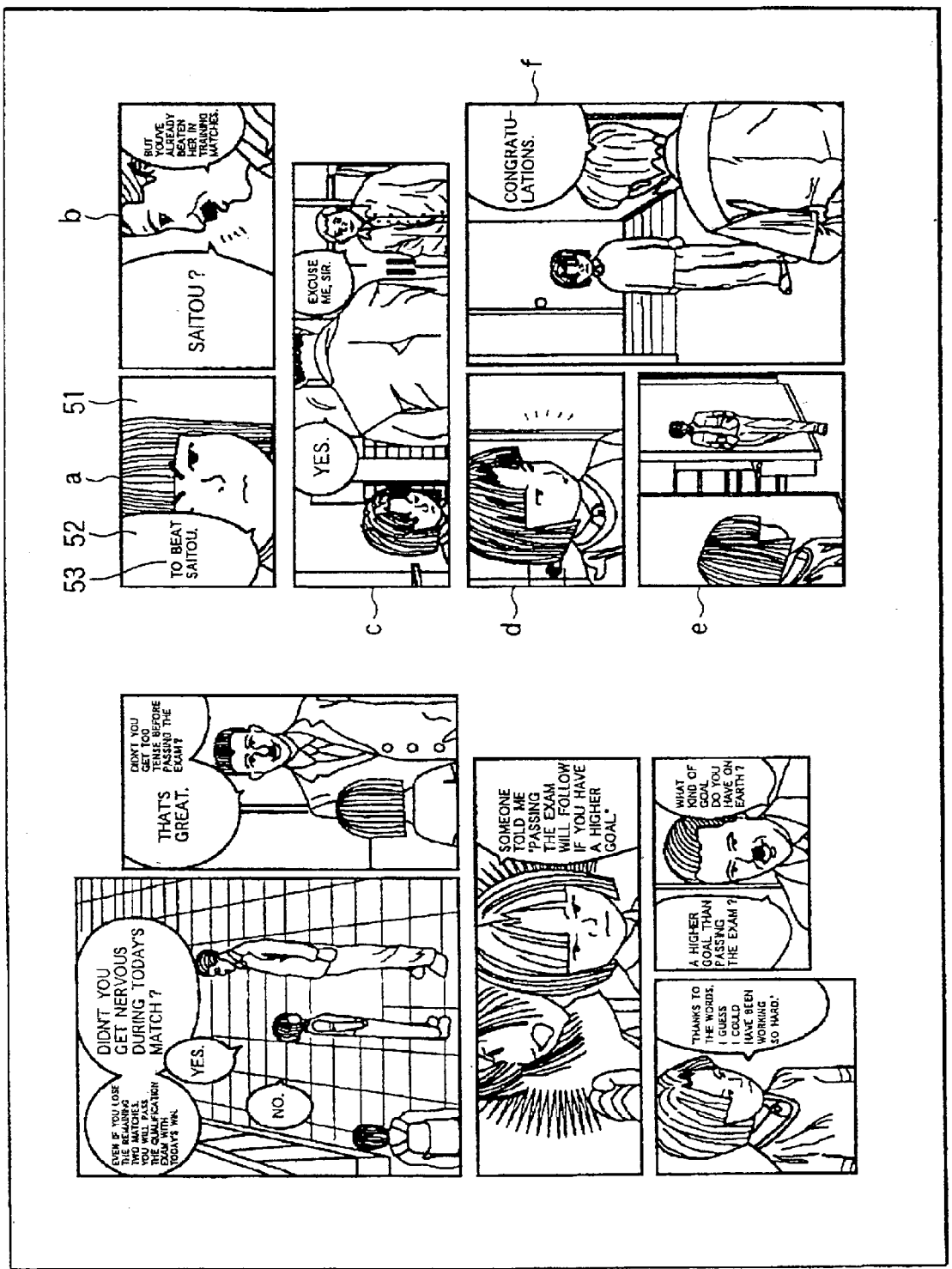
FIG. 5 is a diagram showing a spread display according to an aspect of the present invention.

FIG. 5 shows a two-page spread. This is the same as a state where a magazine is opened, held by hands, and viewed. This state is called "skimming mode" hereinafter.

A detail will be described below based on the comic including six frames in the right-hand side in FIG. 5. Each frame during the viewing process is pre-set in the viewing order of the comic such as a, b, c, d, e, f, g, called frame a, frame b, frame c, frame d, frame e, frame f and frame g, respectively. It is pre-set to view the comic in an order from frame a to frame g.

A portion displaying words 53 spoken by a character is called a balloon portion 52, and the other image portion 51 is called a frame portion.

First of all, a frame advance function will be described. This function is for displaying the comic frame by frame in a predetermined order. This mode is called "careful-reading mode" with respect to the "skimming mode".

Figure 6:
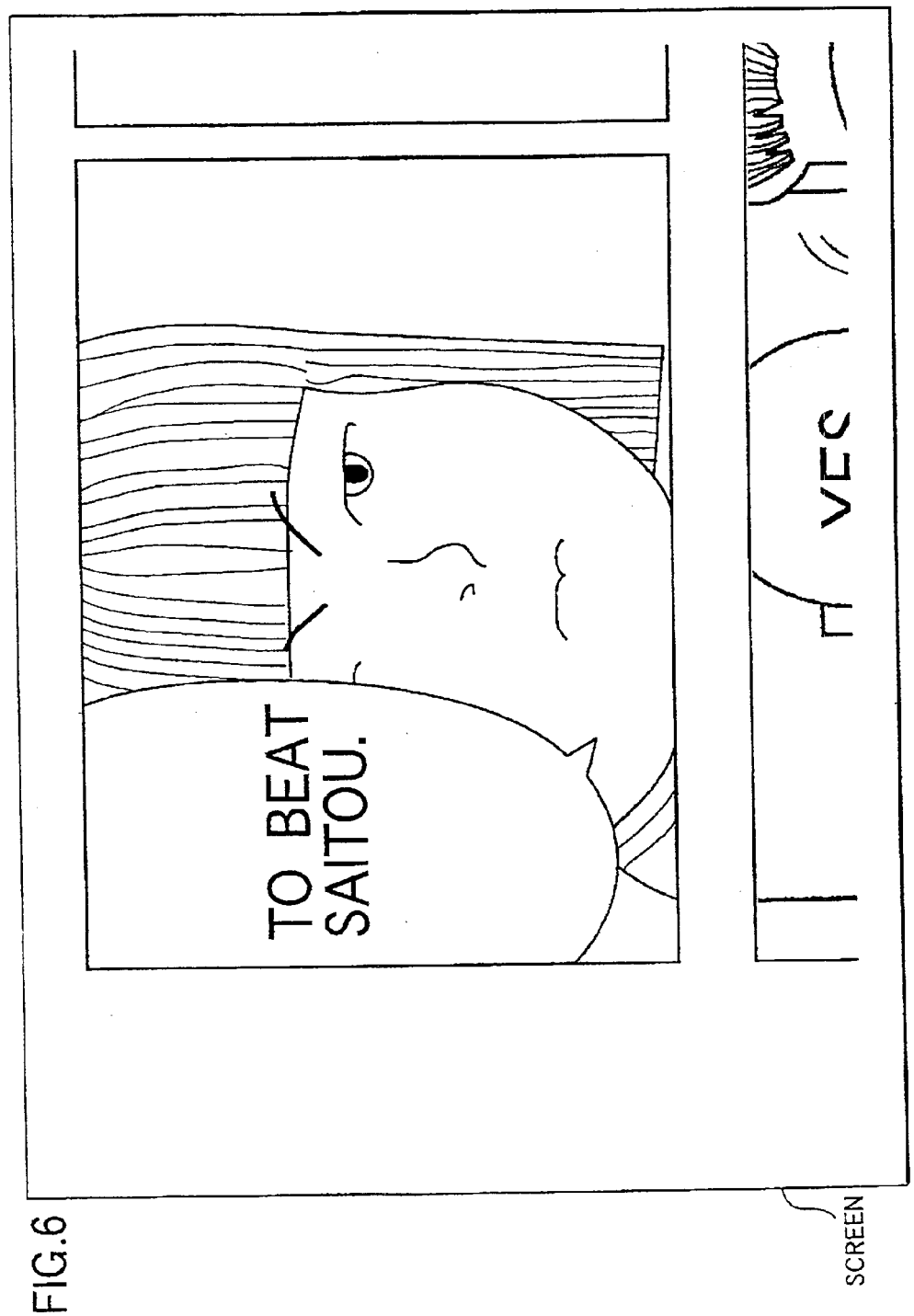
FIG. 6 is an explanatory diagram of frame advance according to an aspect of the present invention.

In response to a selection of this "careful-reading mode", a frame shown in FIG. 6 is displayed first. The one displayed is a zoomed-in version of the frame a in FIG. 5. The frame a in FIG. 5 is zoomed-in in order to display the frame a in a proper size on the screen in accordance with the size of the frame a.

Figure 7:
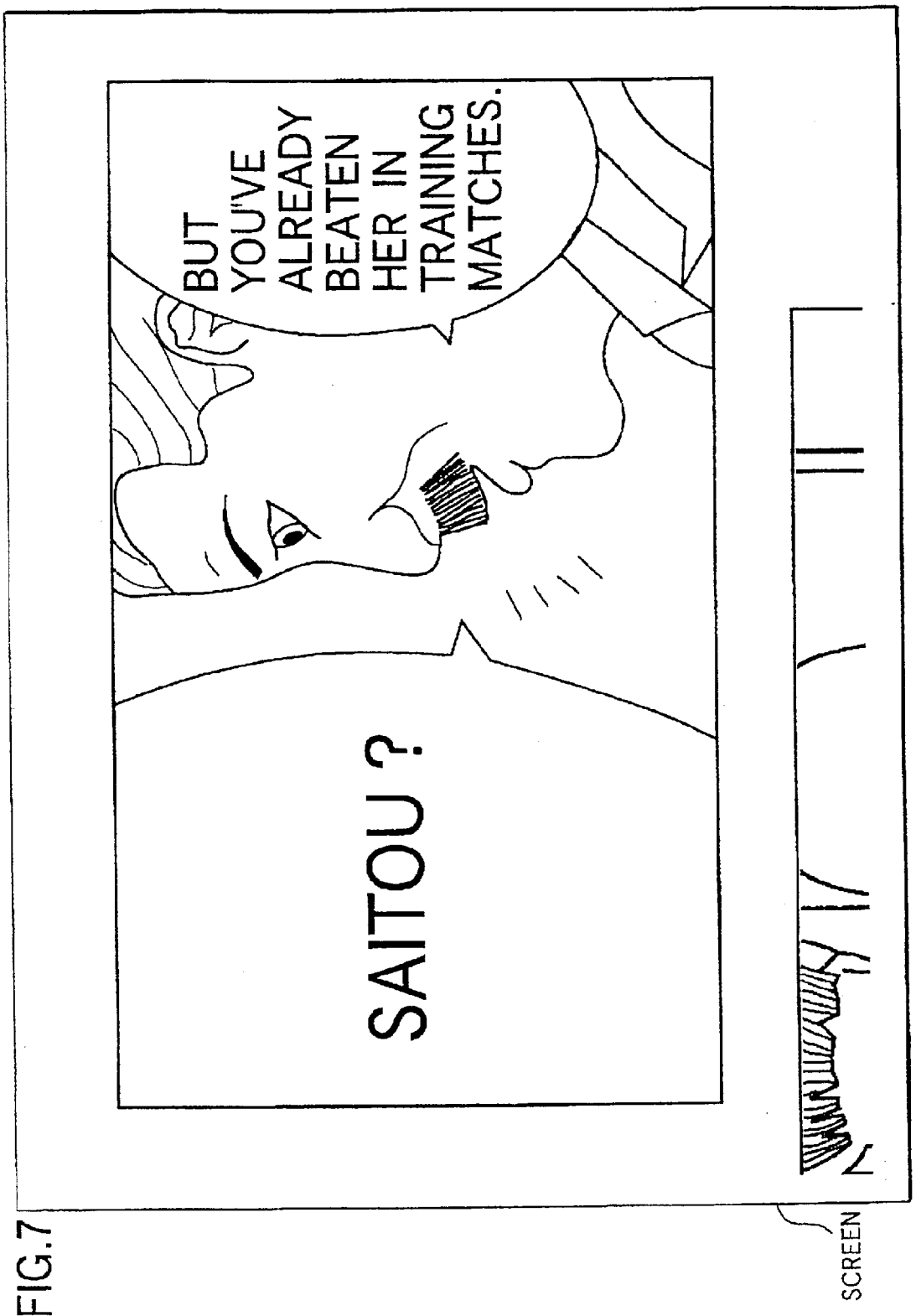
FIG. 7 is an explanatory diagram of frame advance according to an aspect of the present invention according to an aspect of the present invention.

Then, in response to a predetermined operation by using the controller, the frame a is switched to an image in FIG. 7 which is the next frame. This frame corresponds to the frame b in FIG. 5, whose suitable size is selected in accordance with the size of the frame, like the frame shown in FIG. 6. Furthermore, in response to a predetermined operation by using the controller, the frame b is switched to an image in FIG. 8 which is the next frame. This frame corresponds to the frame c in FIG. 5, whose suitable size is selected in accordance with the size of the frame, like the frame shown in FIG. 6.

Figure 8:
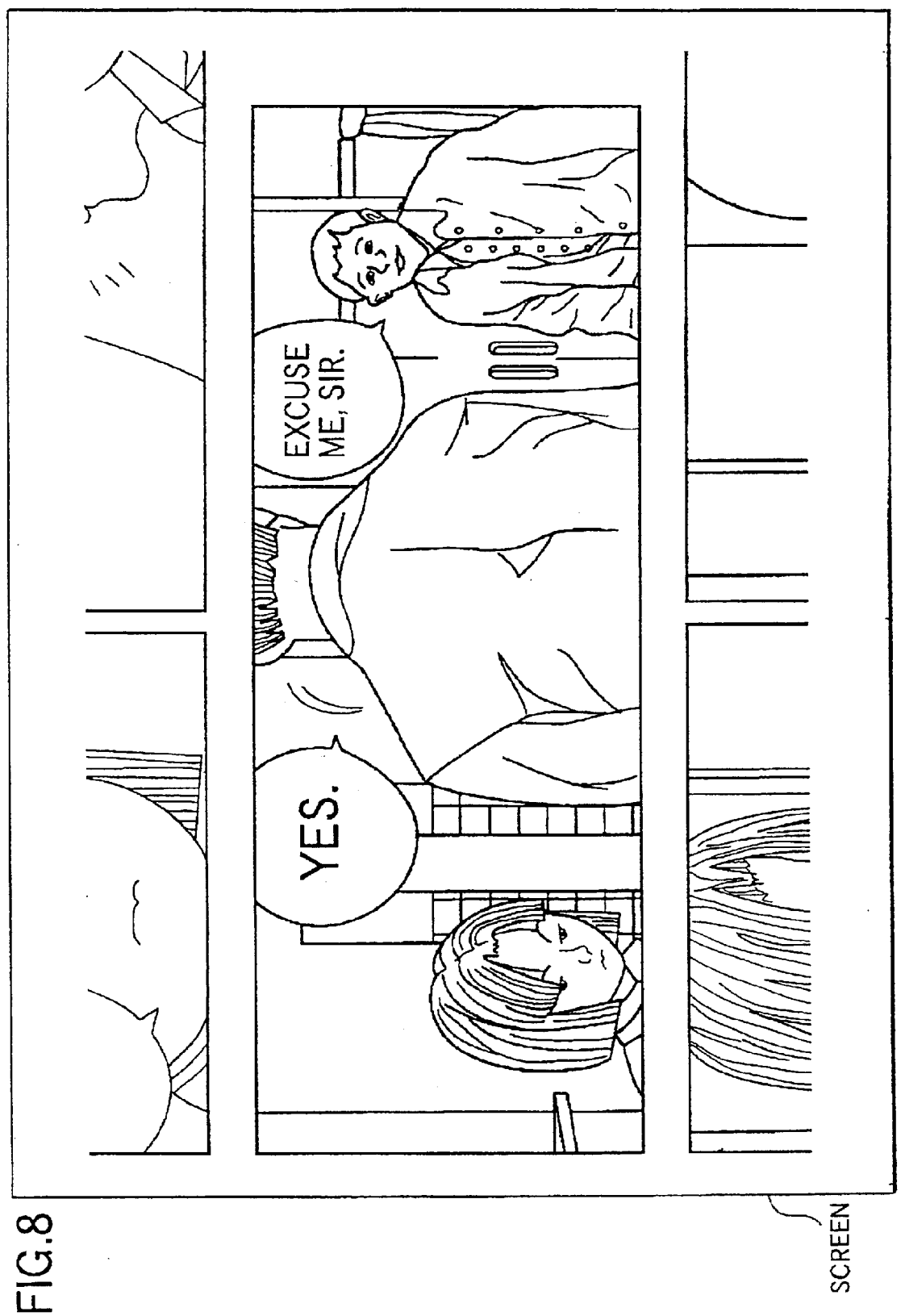
FIG. 8 is an explanatory diagram of frame advance according to an aspect of the present invention.

However, the frame c is wide. Since the width is determined in accordance with the width of a screen displayable area, a bottom portion of the frames a and b and upper portion of the frames d and f are displayed on the screen as shown in FIG. 8.

Figure 9:
FIG. 9 is an explanatory diagram of zooming-in according to an aspect of the present invention.

A screen shown in FIG. 9 displays a zoomed-in version of the frame c. The zoomed-in display is performed through another predetermined operation by using the controller. Here, a displayed screen area is moved in response to a user operation. Also, the scaling is changed in accordance with a user operation.

Figure 10:
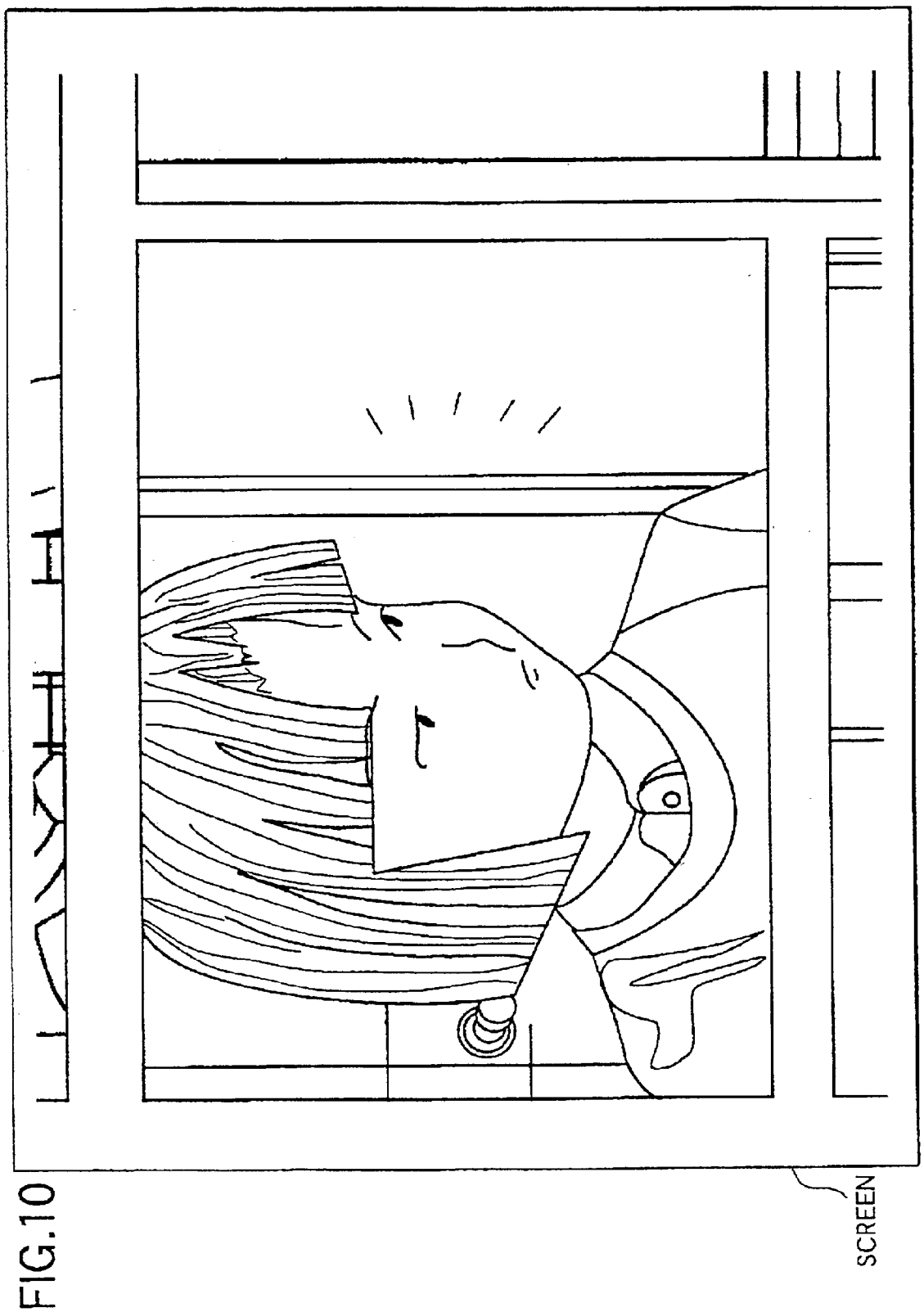
FIG. 10 is an explanatory diagram of frame advance according to an aspect of the present invention.
Figure 11:
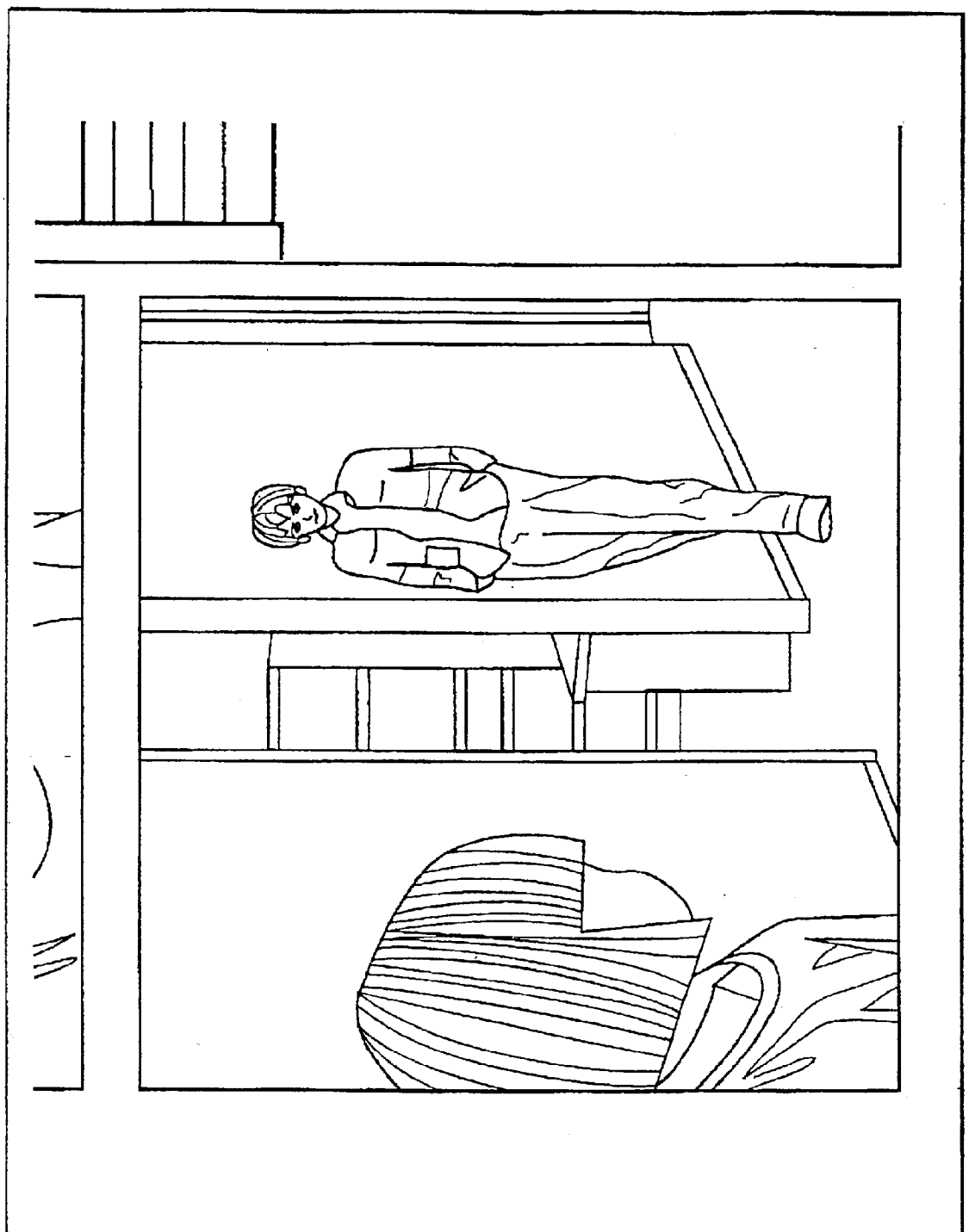
FIG. 11 is an explanatory diagram of frame advance according to an aspect of the present invention.
Figure 12:
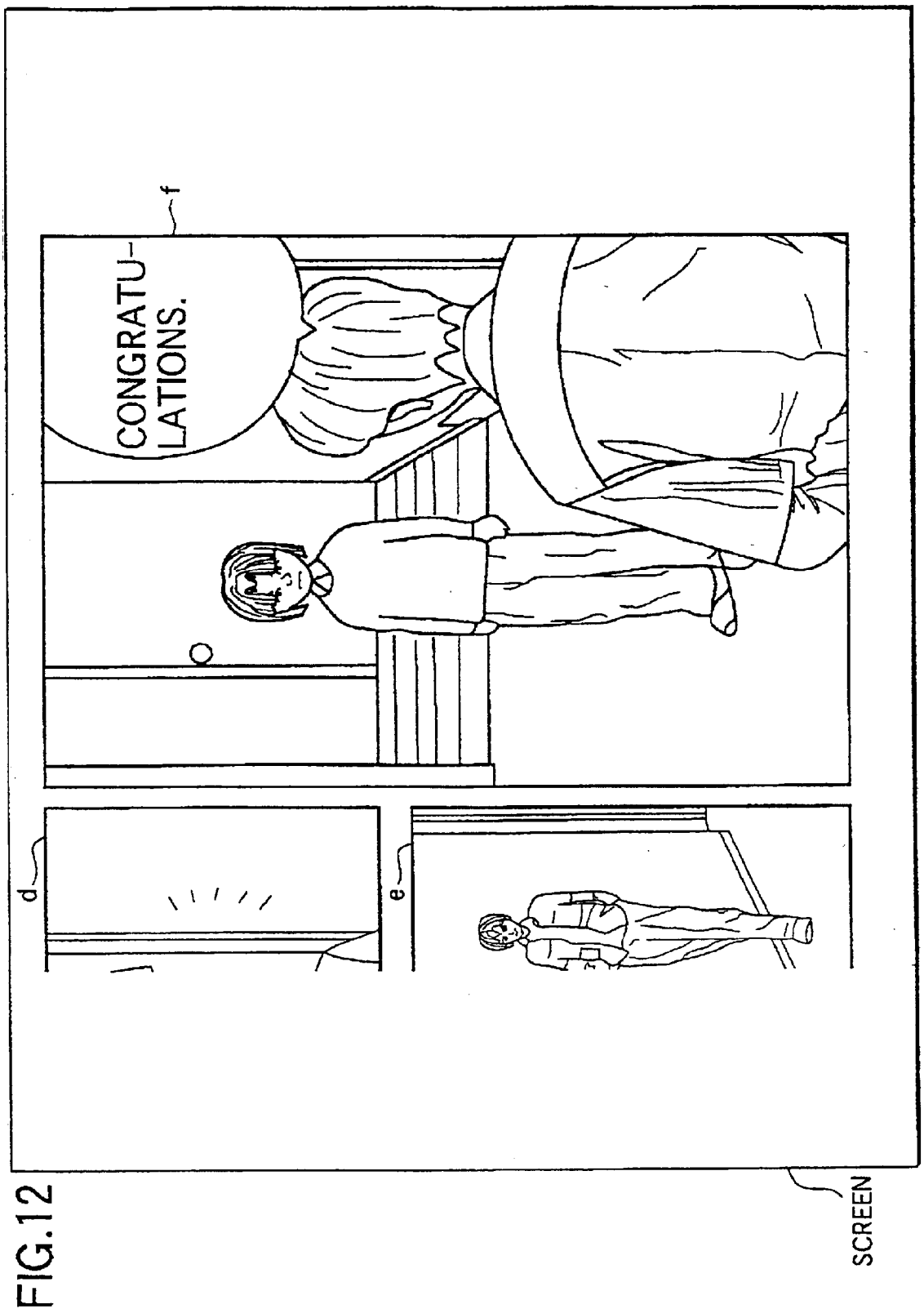
FIG. 12 is an explanatory diagram of frame advance according to an aspect of the present invention.

Furthermore, in response to a predetermined operation by using the controller, the image is switched to the subsequent images in FIGS. 10, 11, and 12 in order. The images correspond to subsequent frames d, e, and f, whose suitable size is selected automatically in accordance with the size of the frame, like the frame shown in FIG. 6.

In addition, as shown in FIG. 12, if the vertical length is set to be equal to the vertical length of the screen displayable area, the right portion of frames d and e, which frames exists in the left direction of frame f, are displayed on the screen.

As described above, the frame advance function according to the present invention allows the user to view a comic frame by frame by zooming in each frame at a proper speed for himself/herself.

Figure 13:
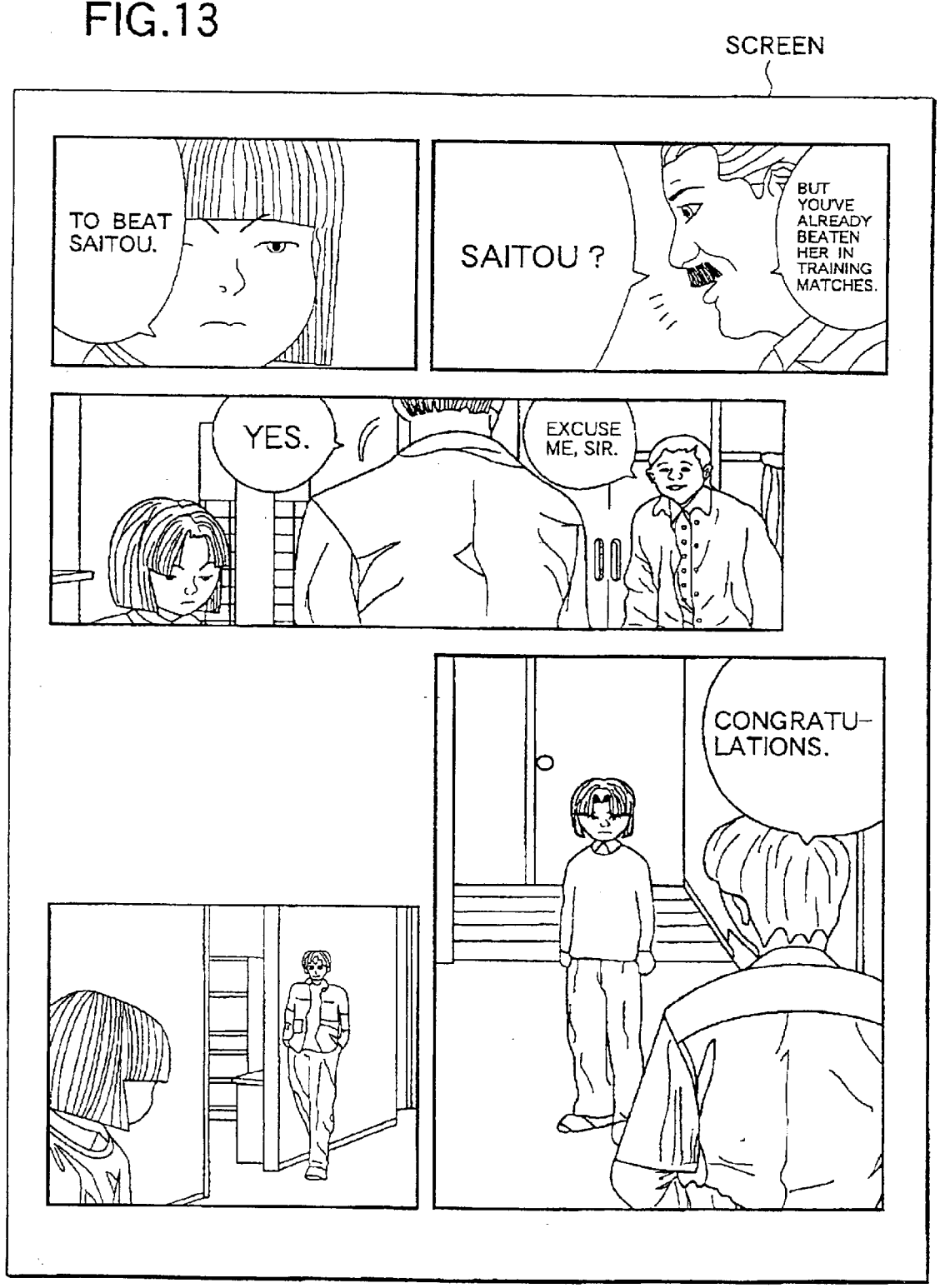
FIG. 13 is an explanatory diagram of fade-in of one frame according to an aspect of the present invention.

Next, entire frame fade-in and fade-out functions according to the present invention will be described. In FIG. 13, frame d which has been in the right side (which includes frame a to frame f) of FIG. 5 is not displayed. In an operation, the entire frame d is filtered. However, the other methods can be applied to cause the same effect.

Figure 14:
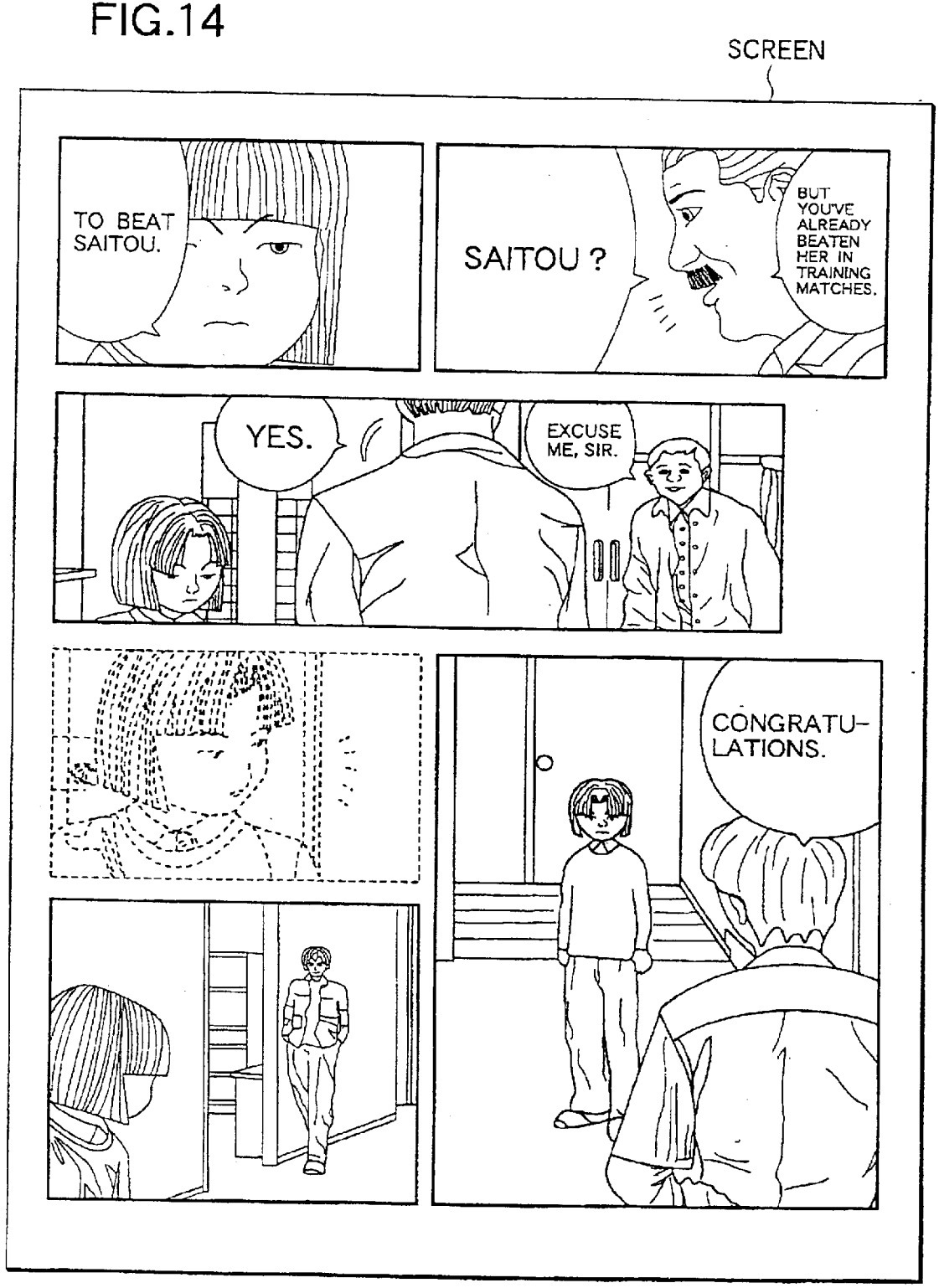
FIG. 14 is an explanatory diagram of fade-in of one frame according to an aspect of the present invention.
Figure 15:
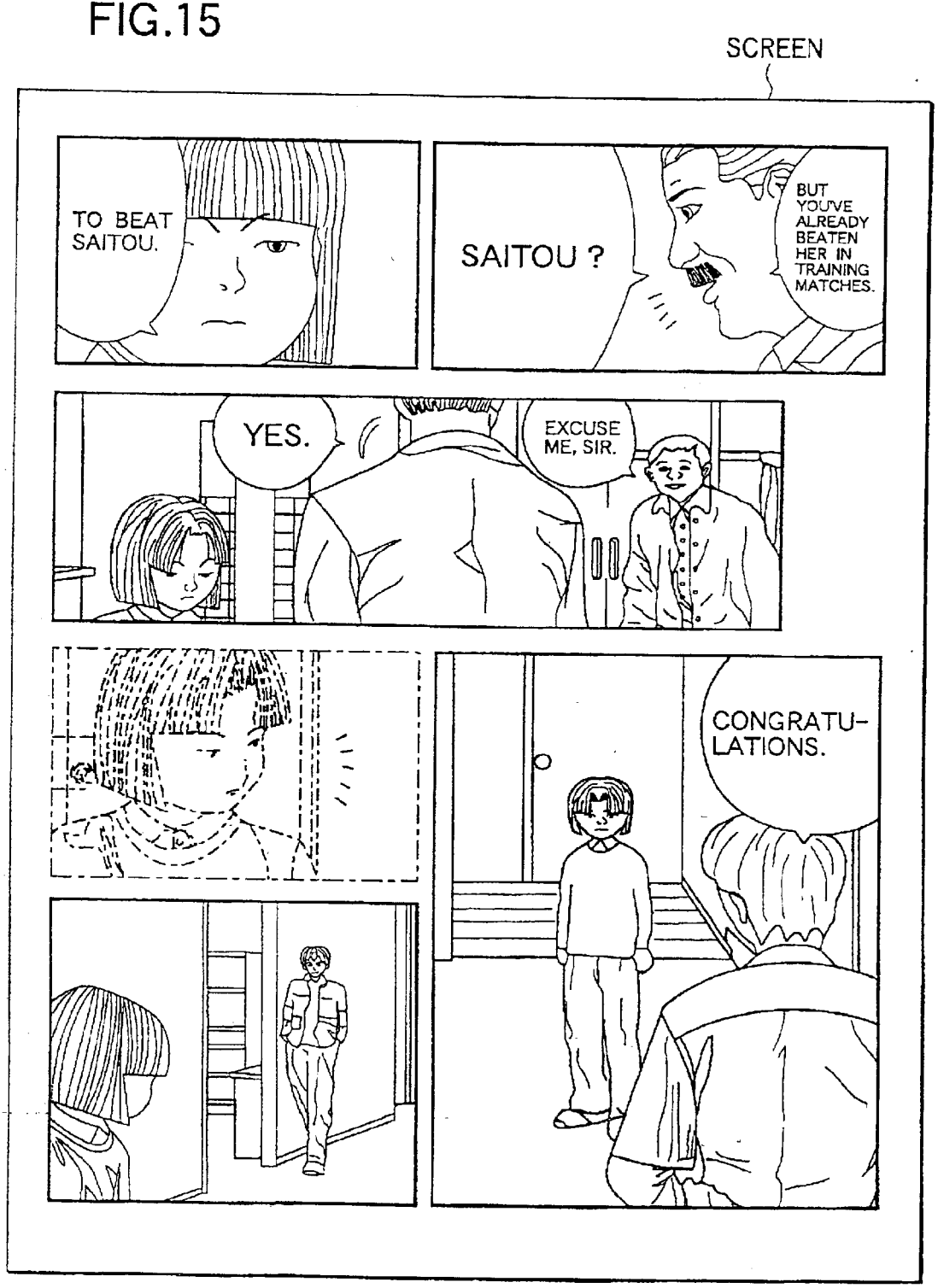
FIG. 15 is an explanatory diagram of fade-in of one frame according to an aspect of the present invention.
Figure 16:
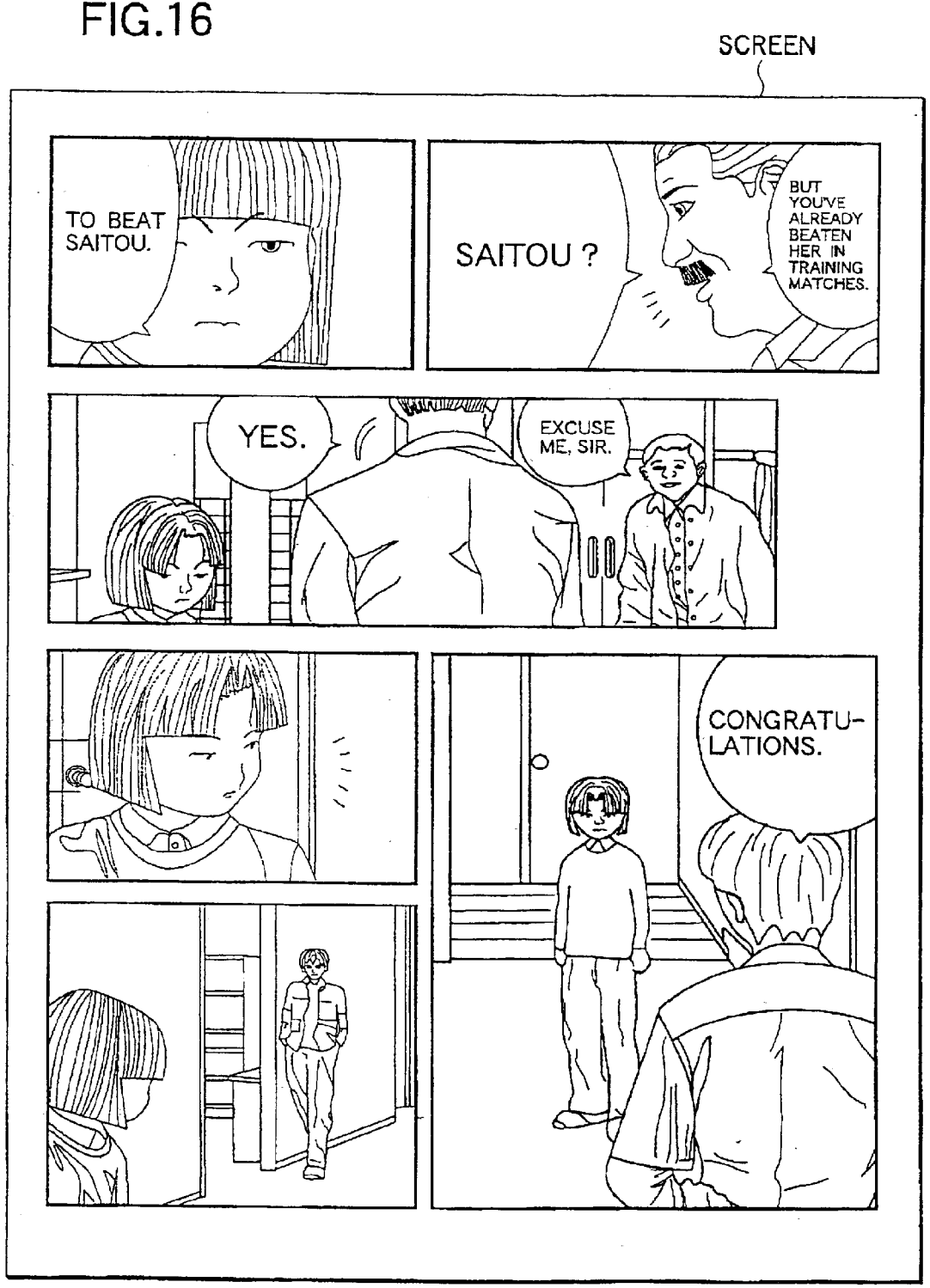
FIG. 16 is an explanatory diagram of fade-in of one frame according to an aspect of the present invention.

FIG. 14 shows a state where the frame d is displayed lightly. Furthermore, FIG. 15 shows a state where the frame d is displayed darker than that in FIG. 14. Similarly, FIG. 16 shows a state where the frame d is displayed much darker. Then, FIG. 17 shows a state where the frame d is displayed completely. The fade-out (lightening) effect whereby the entire frame disappears gradually can be achieved by performing the above-described operation in the opposite direction.

In this way, the entire frame-fade-in and fade-out functions for the entire frame according to the present invention can cause entire frame fade-in and fade-out effects that a conventional electronic comic display apparatus cannot achieve. Then, a user can focus naturally on a frame having undergone the fade-in (fade-out) effect.

In addition, a form of an area subject to the "entire frame fade-in or fade-out function" may be a form of a circle, a triangle or a star, which can gather a user's attention better.

Figure 18A:
FIG. 18A to FIG. 18C are explanatory diagrams of translation between Japanese and English according to an aspect of the present invention.

Next, a language-translation function for words according to the present invention will be described. FIG. 18A shows a state where a word portion shown in the frame b in FIG. 5 is not displayed.

Figure 18B:
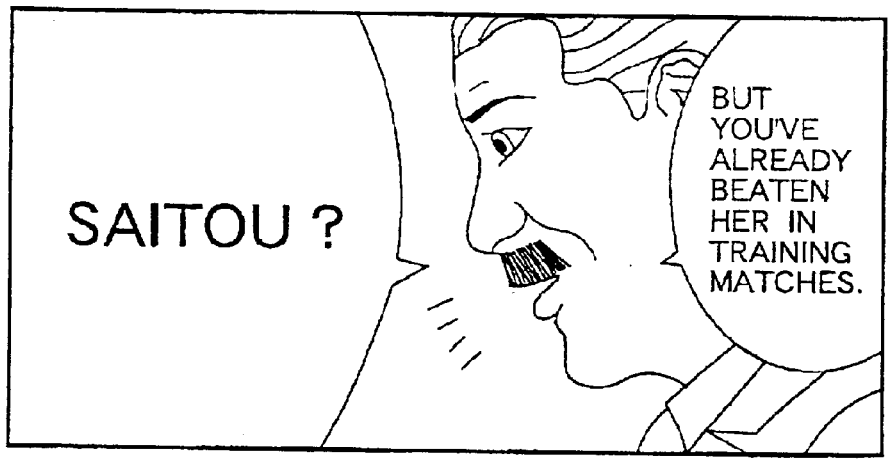
Figure 18C:

Here, when the English language is selected, the words portion in English is inserted to a balloon, which generates the display shown in FIG. 18B. On the other hand, when the Japanese language is selected, the words portion in Japanese is inserted to the balloon, which generates the display shown in FIG. 18C.

Thus, a words portion in the language corresponding to the user's selection is displayed in the balloon. Therefore, text data corresponding to multiple languages are prepared so that users in many countries can enjoy the same comic.

In FIG. 18A, balloons are provided on both the left and right sides of a character. In this case, in accordance with what is spoken by the character, the left balloon may be displayed first, and then the right balloon may be displayed or vise versa. Thus, the balloons can be displayed in the same order as real talk occurs.

Figure 19A:
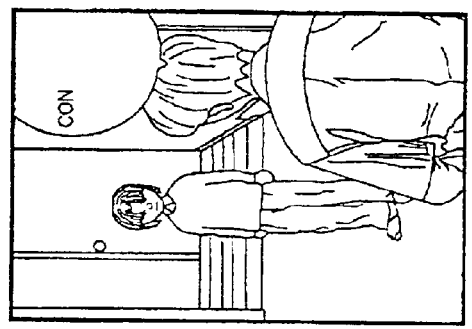
FIG. 19A to FIG. 19G are explanatory diagrams for display of words letter by letter according to an aspect of the present invention.

Next, a function for displaying words sequentially according to the present invention will be described. FIG. 19A shows a screen where only one letter "C" is displayed in the display of the words portion shown in the frame f in FIG. 5.

Figure 19B:
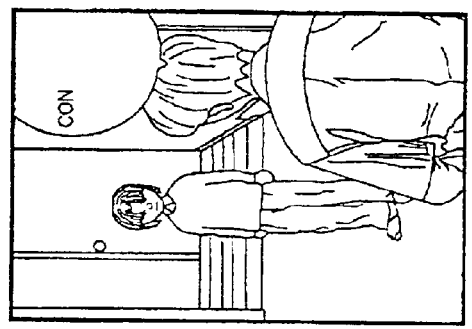
Figure 19C:
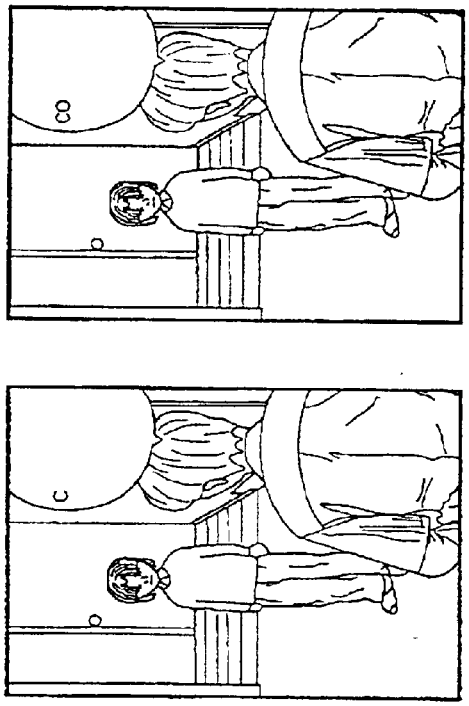
Figure 19D:
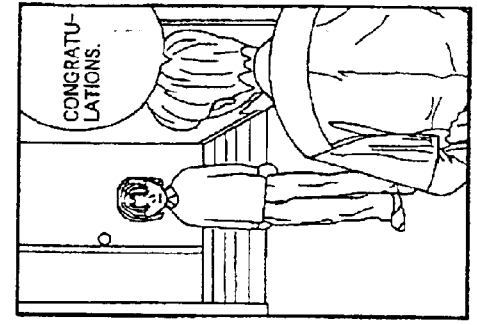
Figure 19E:
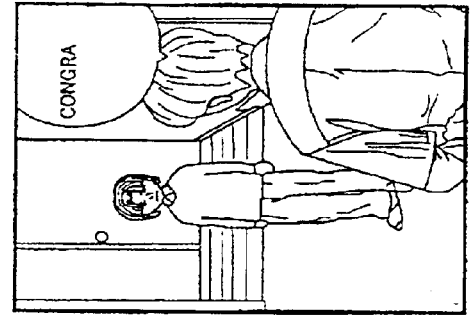
Figure 19F:
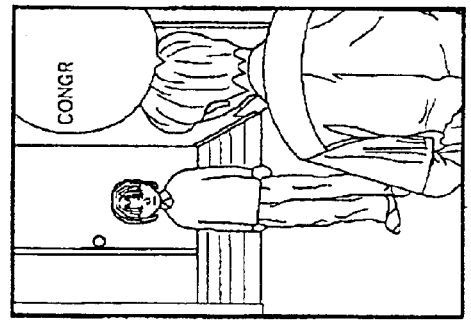

Then, FIG. 19B shows a screen where one letter is added to that in FIG. 19A and two letters, "CO", are displayed. When a predetermined time has passed from the state where the screen in FIG. 19A is displayed, FIG. 19B is displayed.

Figure 19G:
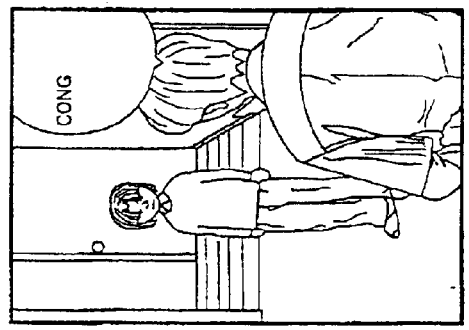

Furthermore, as the display advances to FIGS. 19C, 19D, 19E and 19F, the letters, "N", "G", "R" and "A", are added and displayed one by one. Finally, as shown in FIG. 19G, the word, "CONGRATULATIONS", is displayed completely.

As described above, displaying words letter by letter facilitates a user to understand the content of the words surely. While the words are displayed letter by letter herein, the words can be displayed word by word. In other words, words may be displayed part by part.

Figure 20:
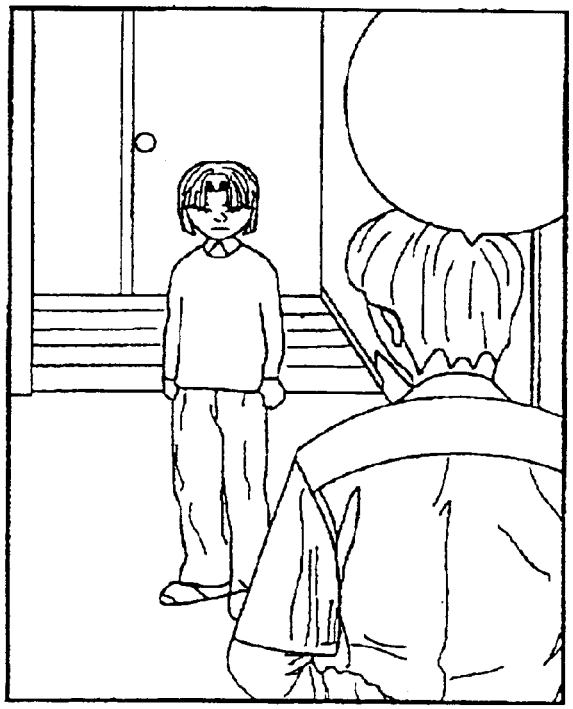
FIG. 20 is an explanatory diagram of fade-in of entire words according to an aspect of the present invention.

Next, words-fade-in or fade-out functions according to the present invention will be described. In FIG. 20, the words in frame f, which is in the right side (which includes frame a to frame f) of FIG. 5, are not displayed. In an operation, an entire balloon portion 61 in the frame f is filtered. However, other methods can be applied to cause the same effect.

Figure 21:
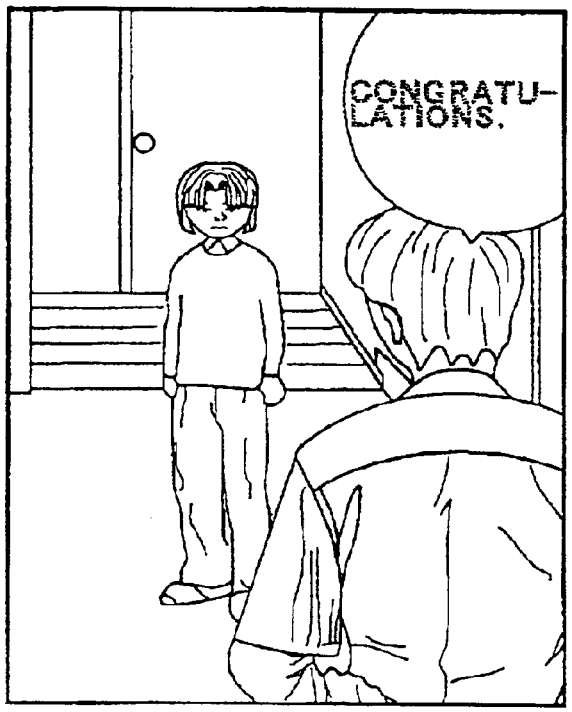
FIG. 21 is an explanatory diagram of fade-in of entire words according to an aspect of the present invention.
Figure 22:
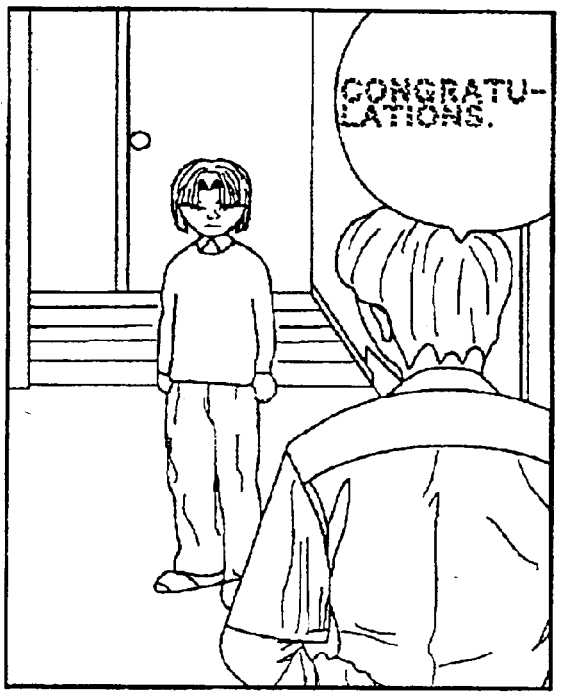
FIG. 22 is an explanatory diagram of fade-in of entire words according to an aspect of the present invention.

FIG. 21 shows a state where the word in the balloon portion 52 is displayed lightly. Furthermore, FIG. 22 shows a state where the word in the balloon portion 52 is displayed darker than that in FIG. 21.

Figure 23:
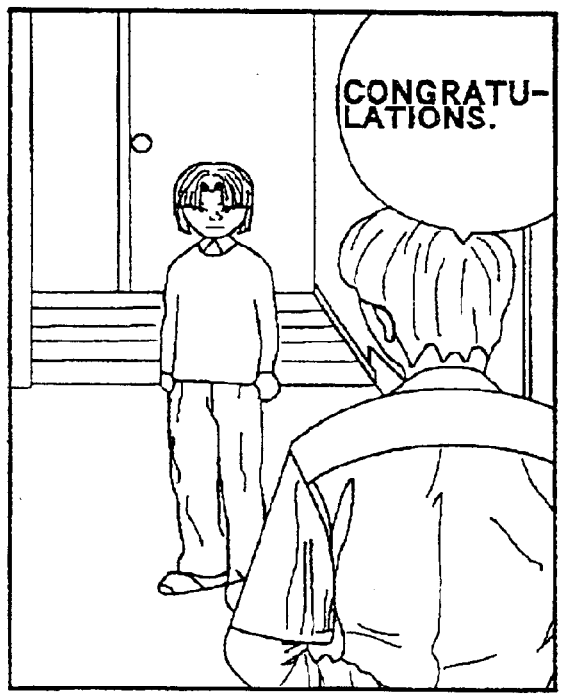
FIG. 23 is an explanatory diagram of fade-in of entire words according to an aspect of the present invention.
Figure 24:
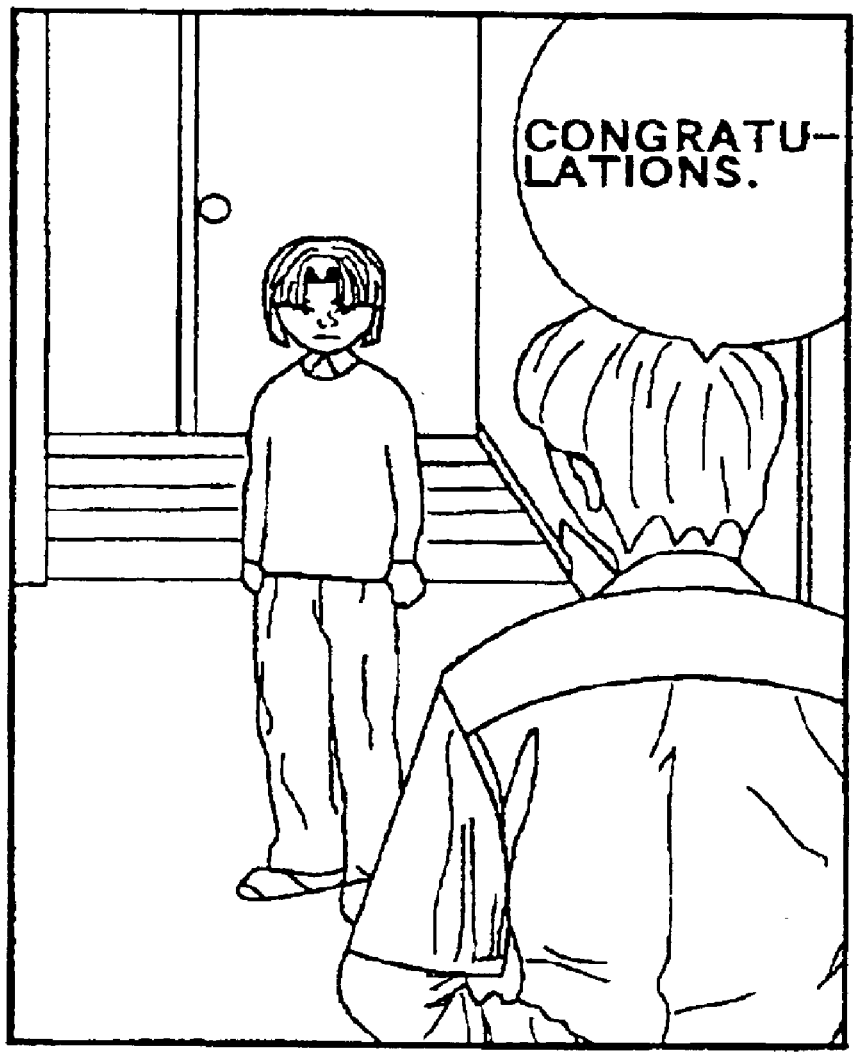
FIG. 24 is an explanatory diagram for display of words frame by frame according to an aspect of the present invention.

Similarly, FIG. 23 shows a state where the word in the balloon portion 52 is displayed much darker. Then, FIG. 24 shows a state where the word in the balloon portion 52 is displayed completely. The fade-out (lightening) effect whereby the all of the words in a balloon portion disappear gradually can be achieved by performing the above-described operation in the opposite direction.

In this way, the words fade-in and fade-out functions according to the present invention can display words in a balloon portion in a specific frame gradually. Thus, the user can focus on the specific frame and understand the content of the words easily.

Figure 25:
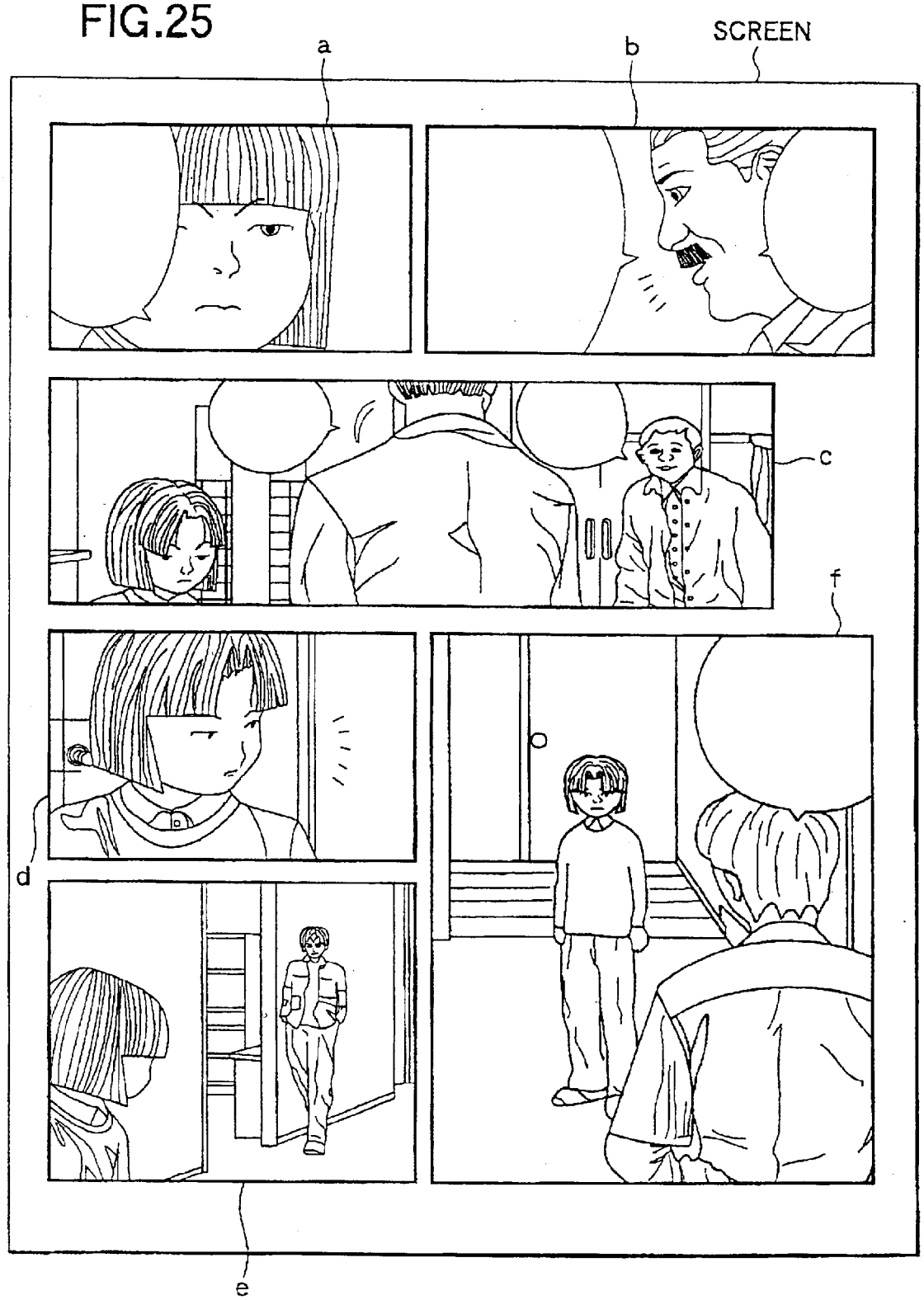
FIG. 25 is an explanatory diagram for display of words frame by frame according to an aspect of the present invention.
Figure 26:
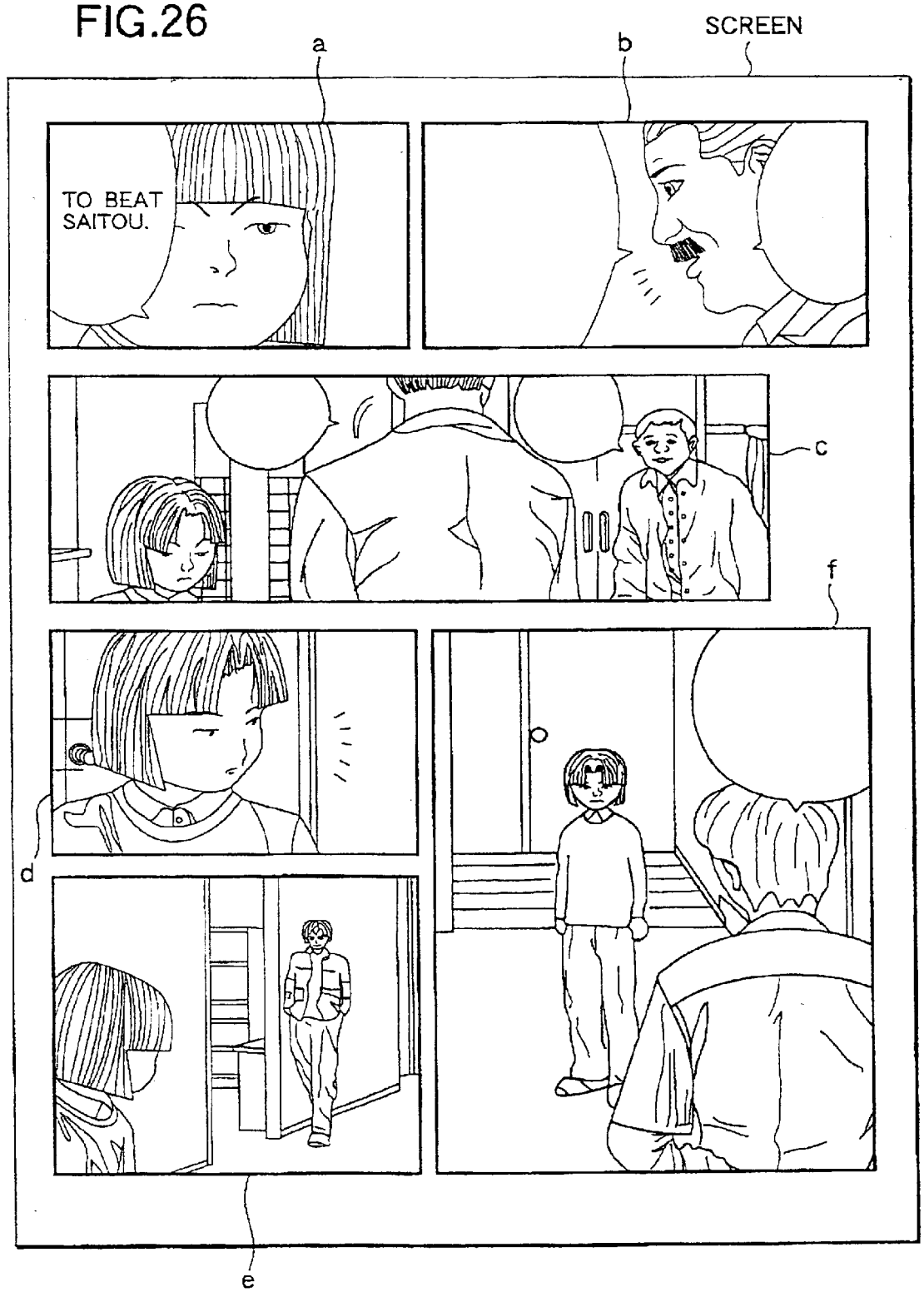
FIG. 26 is an explanatory diagram for display of words frame by frame according to an aspect of the present invention.

Next, a function for sequentially displaying words frame by frame will be described. FIG. 25 is a state where balloon portions in all frames a to f are empty. In response to a predetermined operation, words are written in the balloon portion in the frame a. Then, a state is obtained where words are displayed as shown in FIG. 26.

Figure 27:
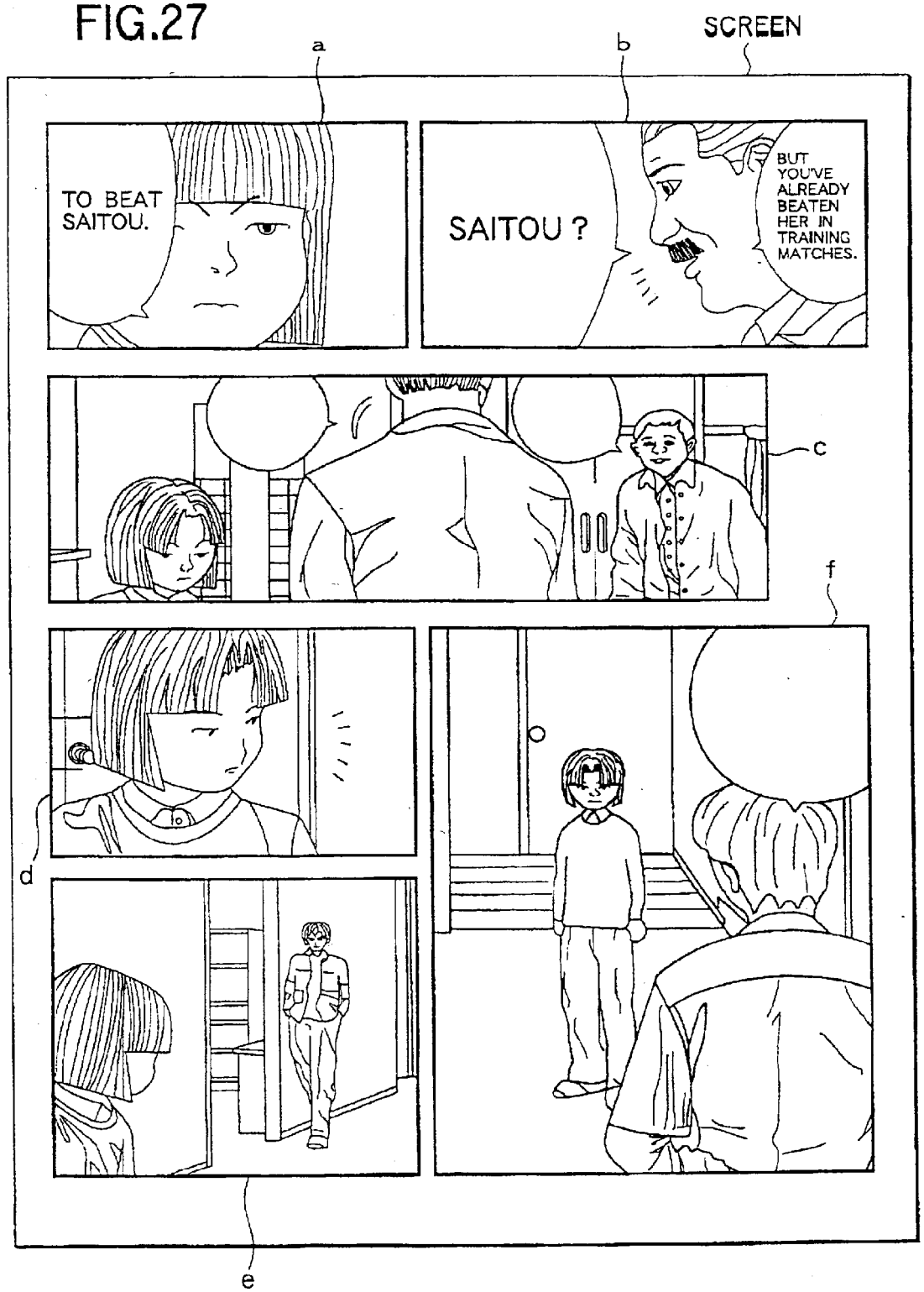
FIG. 27 is an explanatory diagram for display of words frame by frame according to an aspect of the present invention.

Then, words are written in the balloon portion in the frame b, which generates a state where words are displayed as shown in FIG. 27. Here, the balloon portion in the frame a is continuously displayed.

Figure 28:
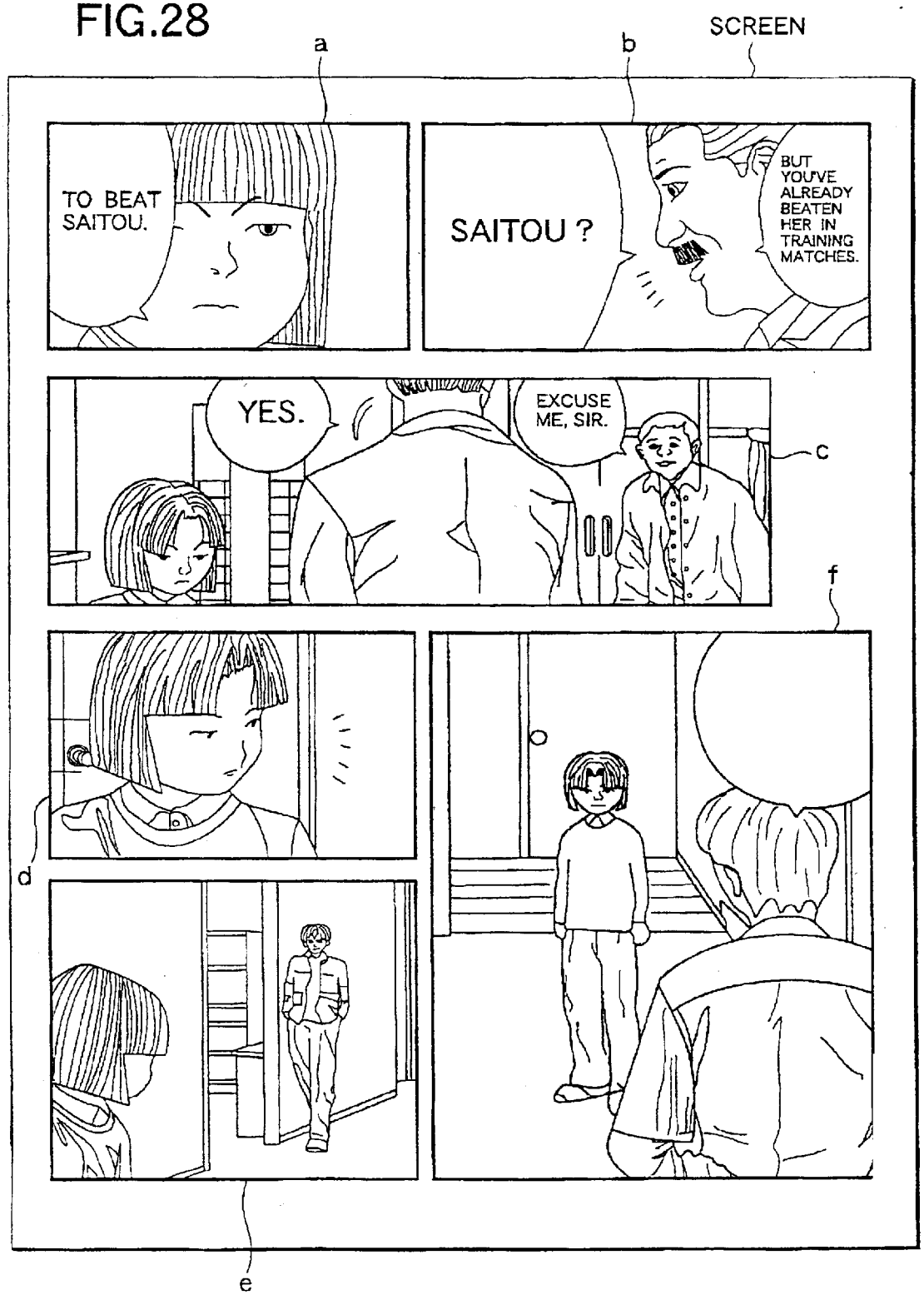
FIG. 28 is an explanatory diagram for display of words frame by frame according to an aspect of the present invention.

Subsequently, words are written in the balloon portion in the frame c, which generates a state shown in FIG. 28. Here, the balloon portions in frames a and b are continuously displayed.

Figure 29:
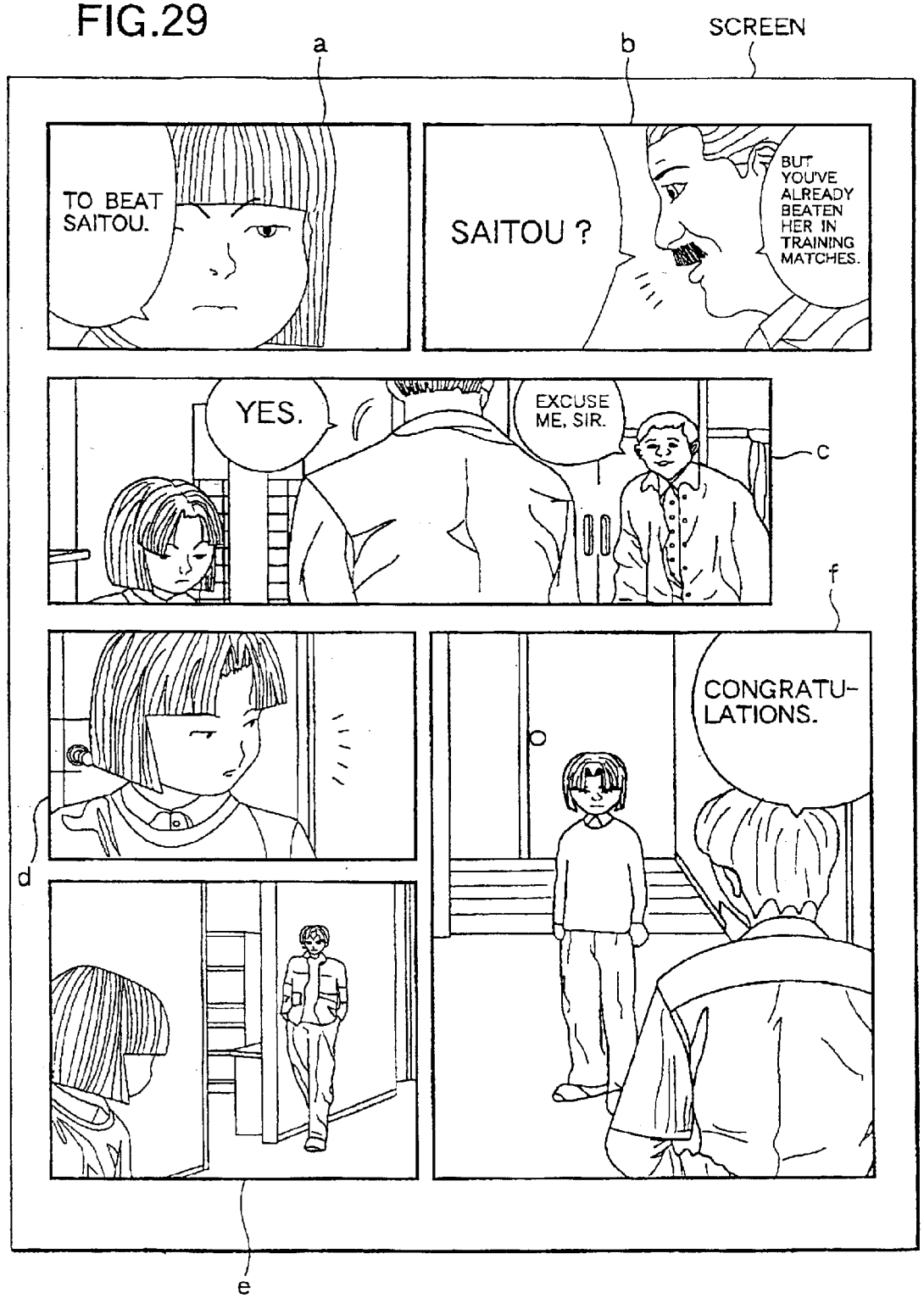
FIG. 29 is an explanatory diagram for display of words frame by frame according to an aspect of the present invention.

Then, words are written in the balloon portion of the frame f, which generates a state shown in FIG. 29. Now, the balloon portions in all of the frames are written.

In this way, the function for sequentially displaying words frame by frame displays words frame by frame sequentially. Therefore, the user can read words in accordance with the context of the comic easily.

Furthermore, since words in the displayed frame are continuously displayed, the words can be read again. On the other hand, words in subsequent frames are not displayed until the user reaches the frame. It prevents the user from reading the words in the subsequent frame in advance and losing interest.

Furthermore, in the above-described example, the words can be displayed clearly by changing the color of the edges of the words into white for example.

Figure 30:
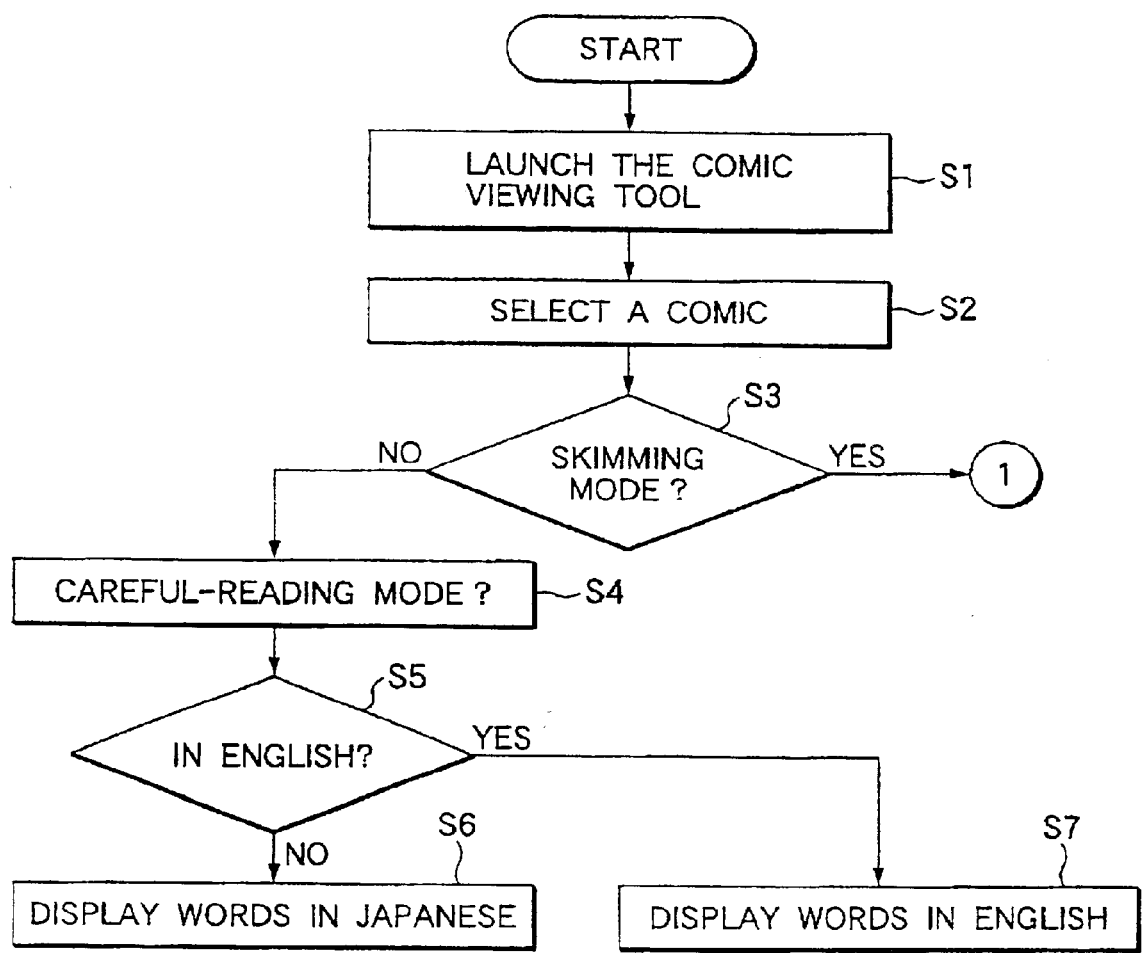
FIG. 30 is a flowchart for explaining processing according to an aspect of the present invention.
Figure 31:
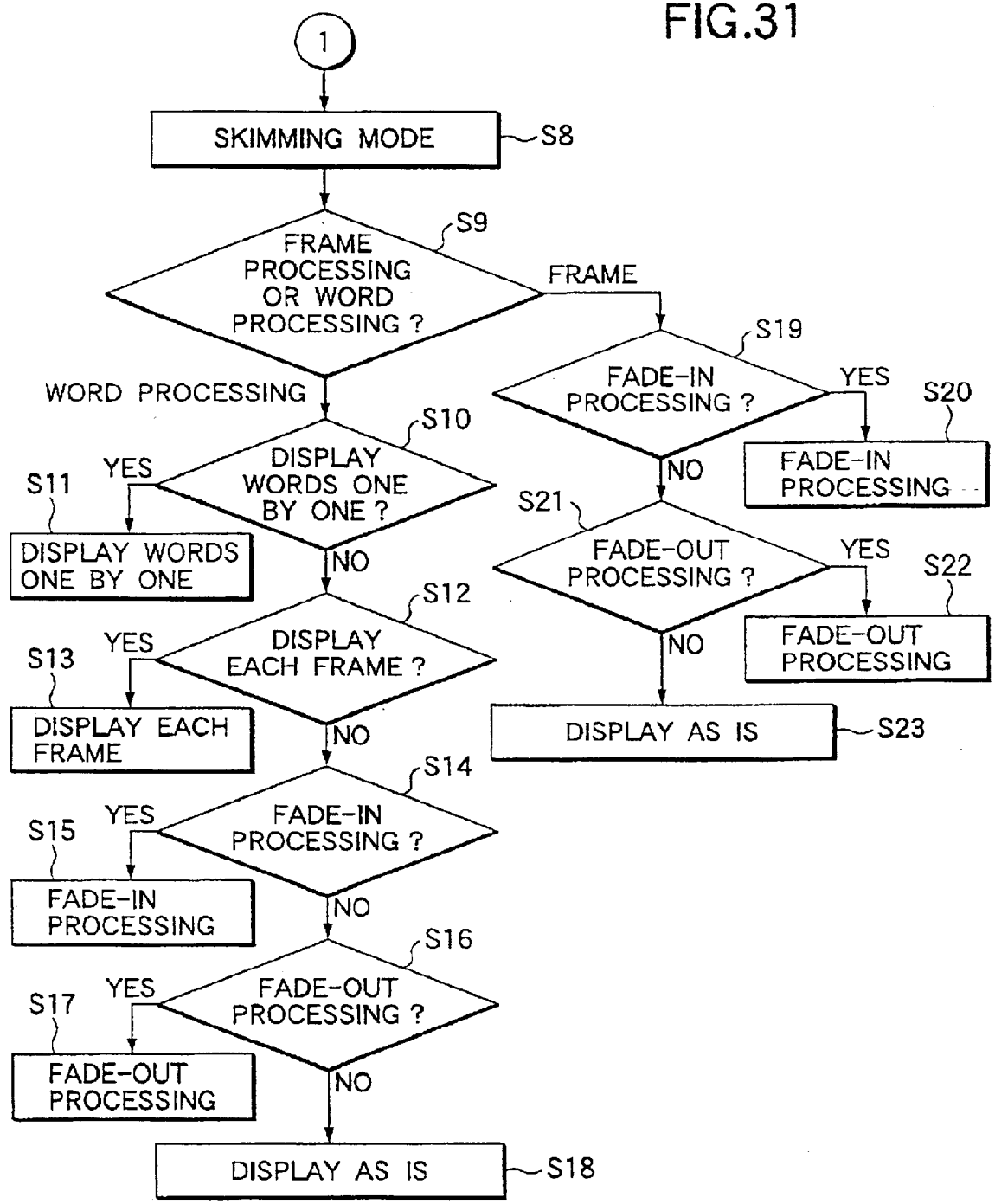
FIG. 31 is a flowchart for explaining processing according to an aspect of the present invention.

Next, an example where comic viewing is performed by using the above-described functions will be described with reference to flowcharts in FIGS. 30 and 31. First of all, the comic viewing tool is launched (S1). Then, a comic selection screen is displayed where a comic is selected (S2). Next, it is determined whether the skimming mode is used (S3). If the skimming mode is not used, the method goes to the careful-reading mode (S4).

Then, it is determined whether the language to be used is English or not (S5). If English is selected, words are displayed in English (S7). Here, if English is not selected, the words are displayed in Japanese (S6).

On the other hand, if the skimming mode is selected in step S3, the skimming mode is selected (S8). Then, either frame processing or words processing is selected (S9). If frame processing is selected, the method goes to step S19. Here, it is determined whether the fade-in processing is used or not (S19). If so, the fade-in processing is performed (S20). Otherwise, the method goes to S21. Then, it is determined whether the fade-out processing is used or not. If so, the fade-out processing is performed (S22). If not, the frame is displayed as it is.

In step S9, if the words processing is selected, it is determined whether processing for displaying words letter by letter is used or not. If the processing for displaying words letter by letter is selected, words are displayed letter by letter (S11). Otherwise, the method goes to step S12, where it is determined whether the processing for displaying words frame by frame is used. If the processing for displaying words frame by frame is selected, words are displayed frame by frame (S13). Otherwise, the method goes to step S14, where it is determined whether the fade-in processing is used or not (S14). If the fade-in processing is selected, the fade-in processing is performed (S15). Otherwise, the method goes to step S16, where it is determined whether the fade-out processing is used or not. If the fade-out processing is selected, the fade-out processing is performed (S17). Otherwise, the words are displayed as they are (S18).

The above-described example is intended for illustrative purposes only, and other combinations are possible.

What is claimed is:

1. An electronic comic viewing apparatus for viewing on a screen of a display device an electronic comic including at least one frame on each page, which frame comprises a balloon portion displaying words and a frame image, wherein the apparatus uses image data, including the balloon portion and the frame image, and text data indicating words in order to display words based on the text data in the balloon portion; and wherein the electronic comic is displayed in a skimming mode and in a careful reading mode, the careful reading mode showing the comic frame by frame on the screen by zooming-in each frame sequentially.

2. The electronic comic viewing apparatus according to claim 1, wherein text data corresponding to at least two languages are stored as the text data and text data corresponding to a selected language is displayed within the balloon in response to a predetermined operation.

3. The electronic comic viewing apparatus according to claim 1, wherein the apparatus displays a next frame in response to a user operation.

4. An electronic comic viewing apparatus for viewing on a screen of a display device an electronic comic including a plurality of frames on each page, at least one frame comprising a balloon portion displaying words and a frame image, the apparatus comprising a careful reading mode and a skimming mode, the skimming mode displaying frames on one page, and performing either fade-in processing or fade-out processing on a predetermined frame of the displayed frames.

5. An electronic comic viewing apparatus for viewing on a screen of a display device an electronic comic including a plurality of frames on each page, at least one frame comprising a balloon portion displaying words and a frame image, the apparatus comprising a careful reading mode and a skimming mode, the skimming mode displaying words part by part within the balloon portion in a predetermined order.

6. An electronic comic viewing apparatus for viewing on a screen of a display device an electronic comic including a plurality of frames on each page, at least one frame comprising a balloon portion displaying words and a frame image, the apparatus comprising a careful reading mode and a skimming mode, the skimming mode displaying at least one frame including words in the balloon portion, and performing either fade-in processing or fade-out processing on all of the displayed words.

7. An electronic comic viewing apparatus for viewing on a screen of a display device an electronic comic including a plurality of frames on each page, at least one frame comprising a balloon portion displaying words and a frame image, the apparatus comprising a careful reading mode and a skimming mode, the skimming mode displaying frames on one page, and sequentially displaying words in a predetermined frame of the displayed frames in a predetermined frame order.

8. An electronic comic viewing method for viewing on a screen of a display device an electronic comic including at least one frame on each page, which frame comprises a balloon portion displaying words and a frame image, comprising:
   storing the balloon portion and the frame image as image data;
   storing words to be displayed in the balloon portion as text data separately from the image data;
   displaying words based on the text data in the balloon portion; providing a careful reading mode and skimming mode and
   displaying the electronic comic frame by frame on the screen by zooming-in each frame sequentially while in the careful reading mode.

9. The electronic comic viewing method according to claim 8, further comprising storing text data corresponding to at least two languages as the text data, and displaying text data corresponding to a selected language within the balloon in response to a predetermined operation.

10. The electronic comic viewing method of claim 8, further comprising displaying a next frame in response to a user operation.

11. An electronic comic viewing method for viewing on a screen of a display device an electronic comic including a plurality of frames on each page, at least one frame comprising a balloon portion displaying words and a frame image, the method comprising:
   providing a careful reading mode and a skimming mode,
   when the skimming mode is selected, displaying frames for one page, and performing either fade-in processing or fade-out processing on a predetermined frame of the displayed frames.

12. An electronic comic viewing method for viewing on a screen of a display device an electronic comic including a plurality of frames on each page, at least one frame comprising a balloon portion displaying words and a frame image, the method comprising:
   providing a careful reading mode and a skimming mode,
   when the skimming mode is selected, displaying words part by part within the balloon portion in a predetermined order.

13. An electronic comic viewing method for viewing on a screen of a display device an electronic comic including a plurality of frames on each page, at least one frame comprising a balloon portion displaying words and a frame image, the method comprising:
   providing a careful reading mode and a skimming mode,
   when the skimming mode is selected, displaying at least one frame including words in the balloon portion, and performing either fade-in processing or fade-out processing on all of the displayed words.

14. An electronic comic viewing method for viewing on a screen of a display device an electronic comic including a plurality of frames on each page, at least one frame comprising a balloon portion displaying words and a frame image, the program comprising:
   providing a careful reading mode and a skimming mode,
   when the skimming mode is selected, displaying frames on one page, and sequentially displaying words in a predetermined frame of the displayed frames in a predetermined frame order.

15. A recording medium on which is recorded a program for viewing on a screen of a display device an electronic comic including at least one frame on each page, which frame comprises a balloon portion displaying words and a frame image, the program comprising:
   a word displaying code segment that uses image data including the balloon portion and the frame image and text data indicating words in order to display words based on the text data in the balloon portion; a mode code segment that provides a careful reading mode and a skimming mode; and
   a comic displaying code segment that displays the electronic comic frame by frame on the screen by zooming-in each frame sequentially.

16. The recording medium according to claim 15, wherein text data corresponding to at least two languages are stored as the text data and text data corresponding to a selected language is displayed within the balloon in response to a predetermined operation.

17. The medium according to claim 15, further comprising a switching code segment that switches display to a next frame in response to a user operation.

18. A recording medium on which is recorded a program for viewing on a screen of a display device an electronic comic including a plurality of frames on each page, at least one frame comprising a balloon portion displaying words and a frame image, the program comprising:
   a mode code segment that provides a careful reading mode and a skimming mode, a display code segment that, when the skimming mode is selected, displays frames for one page, and performs either fade-in processing or fade-out processing on a predetermined frame of the frames.

19. A recording medium on which is recorded a program for viewing on a screen of a display device an electronic comic including a plurality of frames on each page, at least one frame comprising a balloon portion displaying words and a frame image, the program comprising:

a mode code segment that provides a careful reading mode and a skimming mode, a display code segment that, when the skimming mode is selected, displays words part by part within the balloon portion in a predetermined order.

20. A recording medium on which is recorded a program for viewing on a screen of a display device an electronic comic including a plurality of frames on each page, at least one frame comprising a balloon portion displaying words and a frame image, the program comprising:

a mode code segment that provides a careful reading mode and a skimming mode, a display code segment that, when the skimming mode is selected, displays at least one frame including words in the balloon portion, and performs either fade-in processing or fade-out processing on all of the displayed words.

21. A recording medium on which is recorded a program for viewing on a screen of a display device an electronic comic including a plurality of frames on each page, at least one frame comprising a balloon portion displaying words and a frame image, the program comprising:

a mode code segment that provides a careful reading mode and a skimming mode, a display code segment that, when the skimming mode is selected, displays frames for one page, and sequentially displays words in a predetermined frame among the displayed frames in a predetermined frame order.

* * * * *

UNITED STATES PATENT AND TRADEMARK OFFICE
CERTIFICATE OF CORRECTION

PATENT NO. : 6,937,241 B2 Page 1 of 1
APPLICATION NO. : 10/084322
DATED : August 30, 2005
INVENTOR(S) : H. Minagawa et al.

It is certified that error appears in the above-identified patent and that said Letters Patent is hereby corrected as shown below:

On the Title Page, at Item (56), References Cited, the following Foreign Patent Documents were omitted and should be included:

--9-91455 04/04/97 Japan--
--10240915 09/11/98 Japan--

Signed and Sealed this

Seventh Day of November, 2006

JON W. DUDAS
*Director of the United States Patent and Trademark Office*